US011143586B2

(12) United States Patent
Johnson

(10) Patent No.: US 11,143,586 B2
(45) Date of Patent: Oct. 12, 2021

(54) ENHANCEMENT OF FOUNTAIN FLOW CYTOMETRY SIGNAL-TO-NOISE RATIO BY REDUCING BACKGROUND LIGHT INTENSITY

(71) Applicant: University of Wyoming, Laramie, WY (US)

(72) Inventor: Paul E. Johnson, Fort Collins, CO (US)

(*) Notice: Subject to any disclaimer, the term of this patent is extended or adjusted under 35 U.S.C. 154(b) by 0 days.

(21) Appl. No.: 17/099,201

(22) Filed: Nov. 16, 2020

(65) Prior Publication Data

US 2021/0088436 A1    Mar. 25, 2021

Related U.S. Application Data

(62) Division of application No. 16/173,778, filed on Oct. 29, 2018, now Pat. No. 10,871,439.

(51) Int. Cl.
*G01N 21/00* (2006.01)
*G01N 15/14* (2006.01)

(52) U.S. Cl.
CPC ..... *G01N 15/1404* (2013.01); *G01N 15/1436* (2013.01); *G01N 2015/144* (2013.01); *G01N 2015/1486* (2013.01)

(58) Field of Classification Search
CPC .... G01J 3/513; G01J 3/51; G01J 3/02; G01N 15/1459; G01N 21/65
USPC ........................................................... 356/73
See application file for complete search history.

(56) References Cited

U.S. PATENT DOCUMENTS

| 2008/0140341 A1* | 6/2008 | Ralston | G01B 9/02091 |
| | | | 702/155 |
| 2012/0176674 A1* | 7/2012 | Lippert | G02B 21/0032 |
| | | | 359/388 |

* cited by examiner

*Primary Examiner* — Md M Rahman
(74) *Attorney, Agent, or Firm* — Macheledt Bales LLP; Jennifer L. Bales

(57) ABSTRACT

Methods and apparatus for improving signal-to-noise ratio in a Fountain Flow cytometer by reducing the background light intensity. One approach includes constraining an interrogated volume of the sample (e.g., by adding a light absorbing reagent to the sample or introducing a bend into a flow cell through which the sample flows). Another approach includes minimizing Raman scattering from the sample by choosing an excitation filter and an emission filter configured to narrowly encompass light at wavelengths within system excitation and emission peaks.

1 Claim, 11 Drawing Sheets

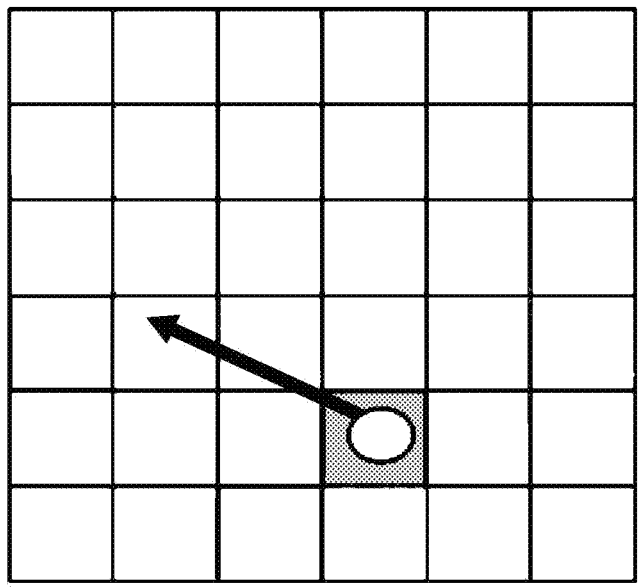
Figure 4A
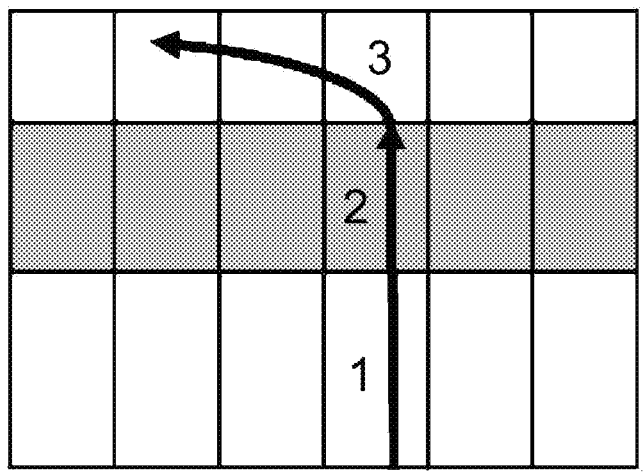 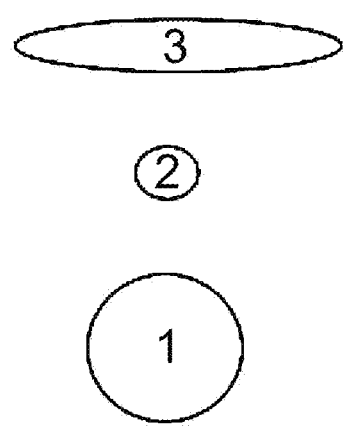
Figure 4B  Figure 4C

ENHANCEMENT OF FOUNTAIN FLOW CYTOMETRY SIGNAL-TO-NOISE RATIO BY REDUCING BACKGROUND LIGHT INTENSITY

FIELD OF THE INVENTION

The present invention relates to improvements in Fountain Flow cytometry (FFC). In particular, the present invention relates to improvements in FFC related to reducing background light intensity.

BACKGROUND

FIG. 1 (Prior Art) is a schematic diagram showing a conventional sheath flow cytometer.

FIG. 2 (Prior Art) is a schematic diagram showing a system 200 used to perform conventional FFC (CFFC) as described in, for example, U.S. Pat. No. 6,765,656 incorporated herein by reference in its entirety. CFFC as described in Johnson, Curr. Protoc. Cytom. 60:1.26.1-1.26.14. 2012, John Wiley & Sons, is a hybrid of conventional sheath flow cytometry (Shapiro, H. M, 1995, "Practical Flow Cytometry-3$^{rd}$ Edition" Wiley-Liss), as shown in FIG. 1 (id.) and video epifluorescence microscopy. The method may include generating illumination with an LED source 228, the light from which passes through a transparent element or flow cell window 208 and induces fluorescence of labeled target particles 210 (for example, labeled microorganisms) in a sample 202 without requiring a filtration step. Unlike conventional flow cytometry, the resulting fluorescence is measured with an imager 218 (e.g., a digital camera incorporating a CCD imager, or a CMOS imager) as the measured sample flows toward the camera along the optical axis 236. The optical axis is an imaginary line that defines the path along which light propagates through the system and through the geometric center of the imaging and/or illumination optics, following deviations by reflective and/or refractive surfaces. The optical axes of illumination and imaging generally coincide within the flow cell. The flow axis is an imaginary line that defines the path along which sample flows through the system and through the geometric center of each cross-section of the flow channel transverse to the flow direction. In the embodiment shown in FIG. 2, a dichroic mirror 224 is used to allow both illumination 212 and fluorescence 214 to occur along the same optical axis 236 without physical elements (e.g., optical elements including: lenses 220, 226, imager 218, filters 216, 222, and LED 228) interfering with each other. Under certain circumstances, one filter (e.g. along the illumination axis) serves as both the excitation filter 216 and the emission filter 222. Sample 202, including target particles 210, enters flow cell 206 at inlet 201, passes through focal plane 234, is diverted by transparent element 208, and exits cell 206 at exit 204.

An automated target particle recognition and enumeration computer program, Biocount™, can be used to count particles (see, U.S. Pat. No. 8,798,338, incorporated herein by reference in its entirety). CFFC allows for detection of target particles in transparent and translucent fluids, such as environmental water, blood, and beverages. In addition, CFFC can be used for detection of target particles in the presence of high photometric background, including unbound fluorescent dye (stain). This facilitates use of the technique in situations where cells are unwashed. Current applications include, but are not limited to, detecting particles from micron-sized bacteria to multi-millimeter-sized multicellular organisms.

CFFC usually involves fluorescent staining of the suspended microorganisms 210 (or other target particles) to facilitate detection. The resulting fluid sample is passed as a stream in front of a light source 228 (usually an LED), which excites the fluorescent stain. The resulting fluorescence is imaged by optics 226 and measured with an imager 218 (e.g., a CCD imager), as the measured sample flows toward the optics and camera along the optical axis. In CFFC, the column of flowing sample is both viewed and illuminated end-on, generally using a dichroic mirror 224 to allow for coincidence of the illumination and imaging optical axes with the flow axis. The device can be thought of as an epifluorescence microscope with a flowing stage. The volume imaged at any instant is controlled by the depth of field of the objective. The sample flows through a circular channel, typically 2-4 mm in diameter, large enough to inhibit clogging, yet small enough to enable imaging of the individual target particles flowing through it. The large diameter of the flow channel removes the need for a sheath flow. The sample particles are then imaged at focal plane 234, counted and measured photometrically. The imaging optics include an excitation filter 216 and an emission filter 222 for isolating the wavelengths of fluorescent excitation and emission.

FIGS. 3A and 3B (Prior Art) illustrate images captured by the CFFC system of FIG. 2. FIG. 3C is the resulting image when the background is removed by subtracting two images in sequence, the earlier from the latter. FIGS. 4A, 4B, and 4C illustrate the image of a particle upstream of the focal plane, in the focal plane, and downstream of the focal plane respectively.

CFFC imaging of target particles 210 flowing toward the imager 218 results in images of in-focus particles 210 in the focal plane 234 and out-of-focus particles 210 in front of and behind the focal plane 234. Particles normally are not spatially resolved sufficiently to allow for morphological discrimination, but the images can be used to make photometric measurements of target particles throughout the focal plane 234. The focal plane 234 is chosen to minimize the spot size of the target particles, which allows for an increase in signal-to-noise of measurements collected by the CFFC system 200, because the ratio of signal to background light intensity and signal to background noise from unbound dye in any pixel detecting light from a target particle increases as the pixel size approaches the target particle size.

Despite the improvements of CFFC over conventional flow cytometry, there remains a need to enhance the detection sensitivity of the CFFC system.

SUMMARY

The invention is based, in part, upon the discovery that detection sensitivity of the FFC system can be improved significantly by reducing or eliminating the background noise so as to improve measurement quality. The improved system incorporates novel techniques for reducing or eliminating previously unknown or unappreciated sources of noise, resulting in improved measurements.

Sources of Noise

The signal-to-noise ratio of detection is dependent on the intensity of fluorescence from the target particle being detected, the intensity of background light, and the number of pixels over which the signal is spread. The present invention is directed to reducing background light intensity, but these other factors should be considered as well, and in some cases, balanced for an optimal improvement in signal-to-noise. Noise sources can include: photon counting statistics from signal and background in each pixel, variations in background based on fluorescence or scattering by unbound dye, dark current noise (from thermally generated electrons) in the CCD/CMOS imager 218, and the electronic noise associated with reading out each pixel (readout noise). While photon counting (Poisson) statistics in measuring the signal from a source are not dependent on the number of pixels over which the source signal is spread, the noise contribution from background, dark current, and readout noise do depend on the number of pixels over which the target particle is detected.

It has been discovered that background light significantly limits both the dynamic range of CFFC and the signal-to-noise of detection events, which determines the ultimate sensitivity of the system 200. By way of example, imaging a fluorescing particle against a bright background is like trying to see stars during the day, as opposed to night. In order to optimize FFC, background from a number of sources may be attenuated. These background sources can include:

1. Background generated by the liquid sample 202 in which target particles 210 are embedded (e.g., background from fluorescence or Raman scattering). Raman scattering from water is a previously unappreciated but major source of background seen in FFC at typical illumination/detection wavelengths.
2. Fluorescence from the Fountain Flow cytometer (FFC; note that FFC as used herein can refer to either Fountain Flow cytometry or a Fountain Flow cytometer, depending on the context in which it is used) itself, including the flow cell 206 and tubing into and out of the flow cell 206 (not shown).
3. Ambient light leakage scattered, reflected, and/or otherwise directed onto the imager 218.
4. LED 228 light leakage within the conventional Fountain Flow cytometer (CFFC; note that CFFC as used herein can refer to either conventional Fountain Flow cytometry or a conventional Fountain Flow cytometer, depending on the context in which it is used) that is scattered, reflected, or otherwise directed onto the imager 218 without passing through both the excitation 216 and emission 222 filters. In general, it is desirable to seal the entire optical path with light-absorbing (black) and non-fluorescent material, such as black anodized aluminum. It is also desirable to minimize overlap between the bandpasses of the excitation and emission filters.

CFFC uses fast optics (e.g., f/2 or faster) for focusing illumination 212 (e.g., LED light) onto the focal plane 234 and imaging the focal plane 234 with the imager 218. Fast optics, in general, produce more background than seen in other, slower optical systems, such as conventional (sheath) flow cytometers. Raman scattering, which is not normally significant in conventional flow cytometry, can be a limiting factor in CFFC. In conventional cytometry (flow and microscopy) the excitation/emission filters are selected according to the peak excitation and emission wavelengths of the dye being used. In improved FFC according to the present invention, filters can be selected to minimize background from Raman scattering.

In order to reduce background from individual images in CFFC, each image is subtracted from the subsequent image, with negative pixels set to zero (see, e.g., FIGS. 3A, 3B, and 3C). The resulting image difference contains particle detections with background imperfectly removed. Background subtraction typically works well when background is constant from image to image and relatively noise free. Even then background can reduce the dynamic range of detections by occupying a large fraction of the dynamic range available to the detector of choice. In practice, digital imaging devices, such as CMOS and CCD imagers, have limited dynamic range. An effective means of reducing background and its effects on signal-to-noise and dynamic range is to reduce it at its source.

Improved Fountain Flow Cytometry

The present invention includes improvements to CFFC and features techniques for reducing background light intensity by, for example: (i) constraining an interrogated volume (as defined below) of the sample, (ii) minimizing Raman scattering from the sample by choosing an excitation filter and an emission filter configured to narrowly encompass system excitation and emission peaks while avoiding Raman scattering, and (iii) selecting the material for the flow cell to have minimal fluorescence emission in the detection/excitation wavelengths used (e.g., black Delrin®)), as a condition thereof.

In one aspect, the invention provides an apparatus for enumerating particles in a liquid sample. The apparatus includes an imaging flow cytometer configured to flow the sample along a flow axis within a channel having an imaging end and a distal end. The imaging flow cytometer includes a transparent element transverse to the flow axis disposed at the imaging end of the channel; an illumination beam positioned to illuminate, through the transparent element, at least a portion of the sample and thereby particles in the sample; and an imager for imaging an area in a focal plane transverse to the flow axis within the portion of the sample illuminated by the illumination beam. The apparatus also includes a constraining means for constraining an interrogated volume of the sample so that a ratio of the interrogated volume to that portion of the interrogated volume disposed between the focal plane and the transparent element is generally less than 20:1.

In certain embodiments, the ratio of the interrogated volume to that portion of the interrogated volume disposed between the focal plane and the transparent element is less than 5:1. The constraining means can increase a signal-to-noise ratio achieved by the apparatus by at least two-fold compared to an equivalent apparatus without the constraining means when operating under the same conditions.

The noise portion of the signal can originate from Raman scattering, from freely distributed dye (not attached to cells or other particulates), and/or from fluorescence of the apparatus itself. In certain embodiments, the dye used to stain the target particles can include, but is not limited to, a DNA and/or RNA dye, an enzyme-activated dye, a cellulose, chitin, or textile dye, or an antibody-based fluorescent dye.

In certain embodiments, the signal-to-noise ratio is optimized by focusing the illumination onto the orifice (the imaging end of the flow cell portion 502 as shown in FIG. 5B), thereby limiting the illuminated portion of the flow cell to the volume being examined, while minimizing the amount of light scattered or reflected by the walls of the flow cell subsequently captured by the imager. In some embodiments, the signal-to-noise ratio of detection is optimized by minimizing the volume of liquid that is illuminated beyond the focal plane, e.g., by narrowing or tapering the inlet orifice between the distal end of the flow cell channel 502 and the focal plane so that the inlet diameter increases toward the transparent element.

In another aspect, the invention provides an apparatus for enumerating particles in a liquid sample. The apparatus includes an imaging flow cytometer configured to flow the sample along a flow axis within a channel, the channel having an imaging end and a distal end. The imaging flow cytometer includes a transparent element transverse to the flow axis disposed at the imaging end of the channel; an illumination beam positioned to illuminate, through the transparent element, at least a portion of the sample and thereby particles in the sample; and an imager for imaging an area in a focal plane transverse to the flow axis within the portion of the sample illuminated by the illumination beam. The apparatus also includes a constraining means for constraining an interrogated volume of the sample so that, when the sample is illuminated by the illumination beam, a signal-to-noise ratio achieved by the apparatus is increased by at least two-fold compared to an equivalent apparatus without the constraining means when operating under the same conditions.

In certain embodiments, the constraining means is configured to constrain the interrogated volume of the sample so as to increase a dynamic range achieved by the apparatus by at least 20% compared to an equivalent apparatus without the constraining means when operating under the same conditions.

In some instances, the constraining means for constraining the interrogated volume includes a light absorbing reagent (e.g., Evans Blue or Trypan Blue) that is added to the sample. When the light absorbing reagent is added to the sample, it can reduce the optical depth between the focal plane and the transparent element to below about 1 both at a central wavelength of emission and at a central wavelength of excitation.

In other instances, the constraining means for reducing the interrogated volume includes a bend formed in the flow channel beyond the focal plane toward the distal end of the channel. The bend can be configured to attenuate light travelling in either direction through the flow cell by at least 40%, 50%, or 60%. As one example, the bend can attenuate light traveling in a direction from the window 208 toward the flow cell entrance 201 by at least 40%, 50%, or 60%. As another example, the bend can attenuate light traveling from the flow cell entrance toward the window 208 by at least 40%, 50%, or 60%. The bend can also be configured to increase the signal-to-noise ratio achieved by reducing background light intensity sufficiently to balance particle streak length. The bend can be disposed about 1 cm to 4 cm away from the focal plane toward the distal end of the channel. In some embodiments, the channel comprises an acetal homopolymer resin. The apparatus can additionally include an excitation filter and an emission filter configured to facilitate transmission of light at wavelengths within system excitation and emission peaks while minimizing emission from Raman scattering. A wavelength is described herein as being "within" an excitation peak or an emission peak when the wavelength is within full width at half maximum (FWHM) of the peak intensity.

In another aspect, the invention provides an apparatus for identifying particles in a liquid sample. The apparatus includes an imaging flow cytometer configured to flow the sample along a flow axis within a channel having an imaging end and a distal end. The imaging flow cytometer can include a transparent element transverse to the flow axis disposed at the imaging end of the channel; an illumination beam positioned to illuminate, through the transparent element, at least a portion of the sample; and an imager for imaging a focal plane transverse to the flow axis within the portion illuminated by the illumination beam. The apparatus also includes a constraining means for reducing background light intensity that includes an excitation filter and an emission filter configured to minimize Raman scattering from the sample while permitting transmission of light at wavelengths within system excitation and emission peaks such that, when the sample is illuminated by the illumination beam, a signal-to-noise ratio achieved by the apparatus is increased by at least two-fold compared to an equivalent apparatus without the constraining means when operating under the same conditions.

In certain embodiments, the constraining means described in the above paragraph is further configured to constrain an interrogated volume of the sample so that a ratio of an interrogated volume of the sample to that portion of the interrogated volume between the focal plane and the transparent element is less than 20:1. The constraining means can also be configured to constrain the interrogated volume of the sample so that a signal-to-noise ratio achieved by the apparatus is increased by at least two-fold compared to an equivalent apparatus without the constraining means when operating under the same conditions.

In some instances, the constraining means for constraining the interrogated volume is a light absorbing reagent that is added to the sample at concentrations configured to attenuate light traveling away from the window toward the flow cell entrance 201 by at least 40%, 50% or 60% compared to light entering the flow cell through the window 208. The concentration can also be configured to attenuate light approaching the window 208 from the direction of the flow cell entrance 201 by at least 40%, 50%, or 60% compared to light originating at a distal end of the interrogated volume (see FIGS. 8A-8B).

In other instances, the constraining means for constraining the interrogated volume is a bend formed in the flow channel toward the distal end of the channel. The bend can be configured to attenuate light traveling away from the flow cell window by at least 40%, 50%, or 60% compared to light entering the bend. The bend can also be configured to attenuate light travelling toward the window by at least 40%, 50%, or 60% compared to light entering the bend. In certain embodiments, the flow cell is constructed of an acetal homopolymer resin (e.g., a black polyoxymethylene, such as Delrin®).

In another aspect, the invention provides a flow cell for use in an imaging flow cytometer. The flow cell includes a channel configured to flow a sample along a flow axis. The channel can include a distal end, an imaging end, and a bend formed toward the distal end and configured to attenuate light. The bend can be configured to attenuate light traveling away from the flow cell window by at least 40%, 50%, or 60% compared to light entering the bend. The bend can also be configured to attenuate light travelling toward the window by at least 40%, 50%, or 60% compared to light entering the bend. The bend can be formed as an angular dogleg. In some cases, the bend is disposed from about 1 cm to about 4 cm away from the imaging end toward the distal end of the channel. In certain embodiments, the flow cell is constructed of a black polyoxymethylene resin (e.g., an acetal homopolymer such as Delrin®).

In another aspect, the invention provides a method of enumerating particles (e.g., microorganisms) in a liquid sample. The method includes flowing the liquid sample through the channel of any of the apparatus described above and enumerating the particles detected by the imager of the imaging flow cytometer.

In another aspect, a method of identifying particles in a sample of liquid using an imaging flow cytometer is provided. The method includes the following steps: (a) flowing a sample along a flow axis in a channel of the imaging flow cytometer having a transparent element across the flow axis; (b) illuminating at least a portion of the sample through the transparent element with an illumination beam; and (c) imaging a focal plane within the illuminated portion. The method also includes constraining an interrogated volume of the sample so that a ratio of the interrogated volume to that portion of the interrogated volume between the focal plane and the transparent element is less than 20:1.

In certain embodiments, the step of constraining the ratio includes, prior to step (a) or step (b), adding a light absorbing reagent (e.g., Evans Blue or Trypan Blue) to the sample. The light absorbing reagent can be configured to reduce an optical depth between the focal plane and the transparent element to below about 1 at a wavelength of emission and at a wavelength of excitation. In some instances, the method includes selecting the light absorbing reagent based upon a wavelength characteristic of the illumination beam and/or a wavelength characteristic of the imaged light. For example, in some embodiments, the wavelength characteristic can include a wavelength of peak amplitude of the filtered illumination. As another example, in some embodiments, the wavelength characteristic can include a mean wavelength of a filter bandpass. Other example wavelength characteristics are possible. In some instances, the step of constraining the ratio includes forming a bend in the flow channel spaced apart from the focal plane and the transparent element, e.g., from about 1 cm to about 4 cm away from the focal plane.

The method can, in some embodiments, also include, before step (a) or step (b), installing into the imaging flow cytometer, an excitation and emission filter configured to minimize Raman scattering of the sample while permitting transmission of light at wavelengths within system excitation and emission peaks. The Raman scattering reduction achieved by installing the configured filter can be attenuated by at least 30% compared to the method without installing the configured filter under the same conditions. In such embodiments, the most transmitted wavelength of the configured filter can be within 50 nm of the most transmitted wavelength without installing the configured filter under the same conditions.

These and other objects, along with advantages and features of the embodiments of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIGS. 3A and 3B are two successive images of amoebae and background (with the rings representing out-of-focus microorganisms).

FIG. 3C is the difference between the images shown in FIGS. 3A and 3B, showing the amoebae without significant background;

FIG. 4A is a schematic diagram showing individual pixels in the plane of focus as squares and an exemplary trajectory of a cell flowing through a single pixel in the focal plane (shaded);

FIG. 4B is a side view of the exemplary trajectory of a cell moving through the focal plane (shaded);

FIG. 4C shows the relative image size of a cell moving through the focal plane at the three labeled points: 1) below the focal plane, 2) in the focal plane, and 3) above the focal plane, with a transverse velocity producing an elongated image or streak;

DETAILED DESCRIPTION OF THE INVENTION

The instant invention is directed to systems and methods that reduce the amount of background light intensity and accompanying noise detected by CFFCs. In some instances, background light intensity is referred to herein as "background." Apparatuses for reducing background light intensity include: (1) constraining an interrogated volume (as that term is defined below) of a FFC by adding a light absorbing reagent to the measured sample; (2) constraining an interrogated volume of a FFC by reconfiguring the flow cell, for example, by adding a bend in the flow channel upstream from the focal plane and the transparent element (window); and (3) using an excitation/emission filter pair specifically selected not only for the dye used to stain the particles being detected but also to minimize Raman scattering from the liquid media (e.g., water) within which the particles are suspended, and to have minimum out of band transmission. In the latter approach, the filters can be chosen to narrowly encompass the excitation and emission peaks. By way of example, when a green-emitting nucleic acid DNA/RNA dye such as FITC (fluorescein) or SYBR Green I is used to stain bacteria, the following exemplary filters from Semrock™ can be used: FF505-SDI01-25X36 (dichroic), FF02-472/30-25 (excitation), and FF02-520/28-23-D (emission).

Conventional Fountain Flow Cytometer

Figure 1:
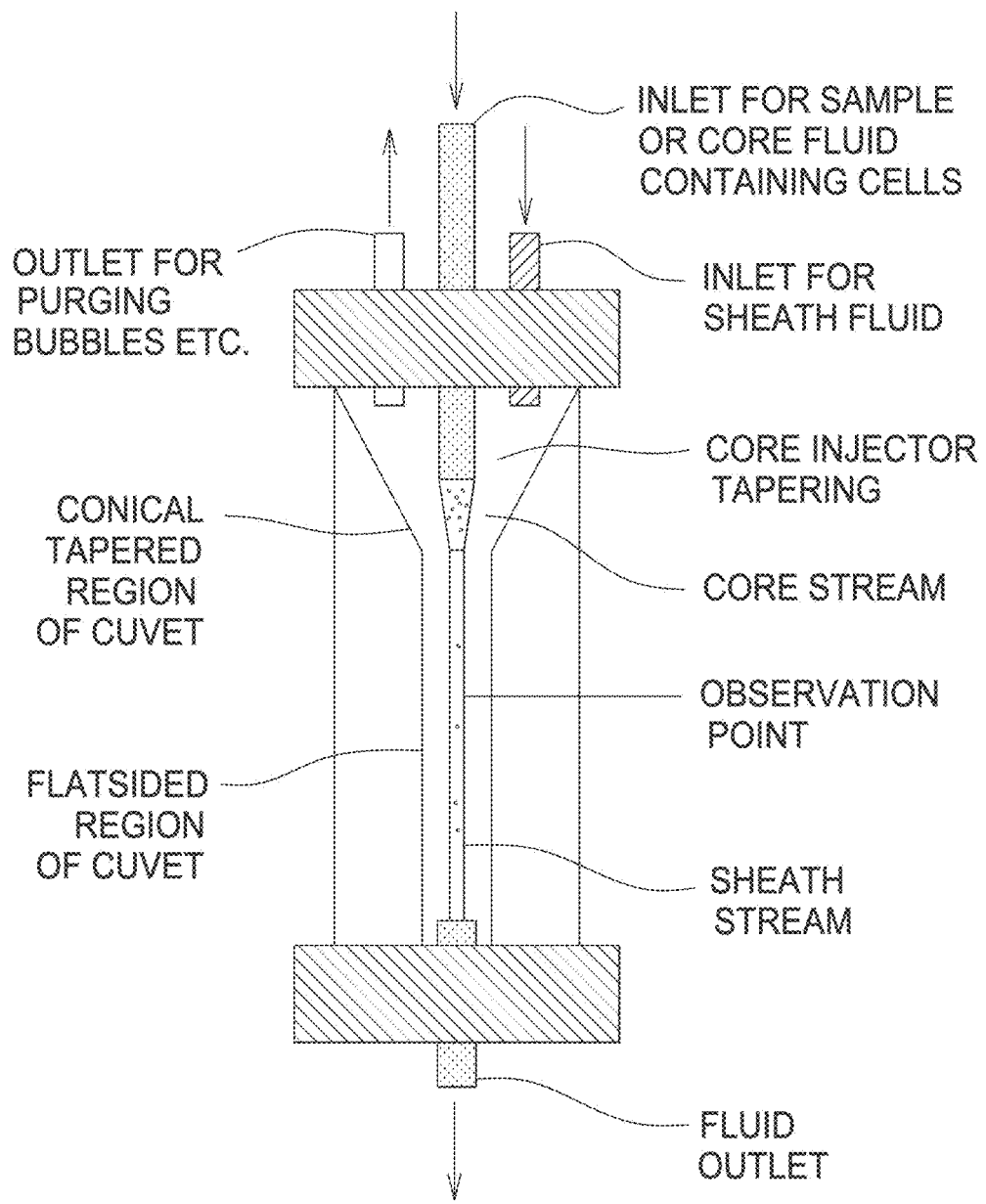
FIG. 1 (Prior Art) is a schematic diagram of a conventional sheath flow cytometer.
Figure 2:
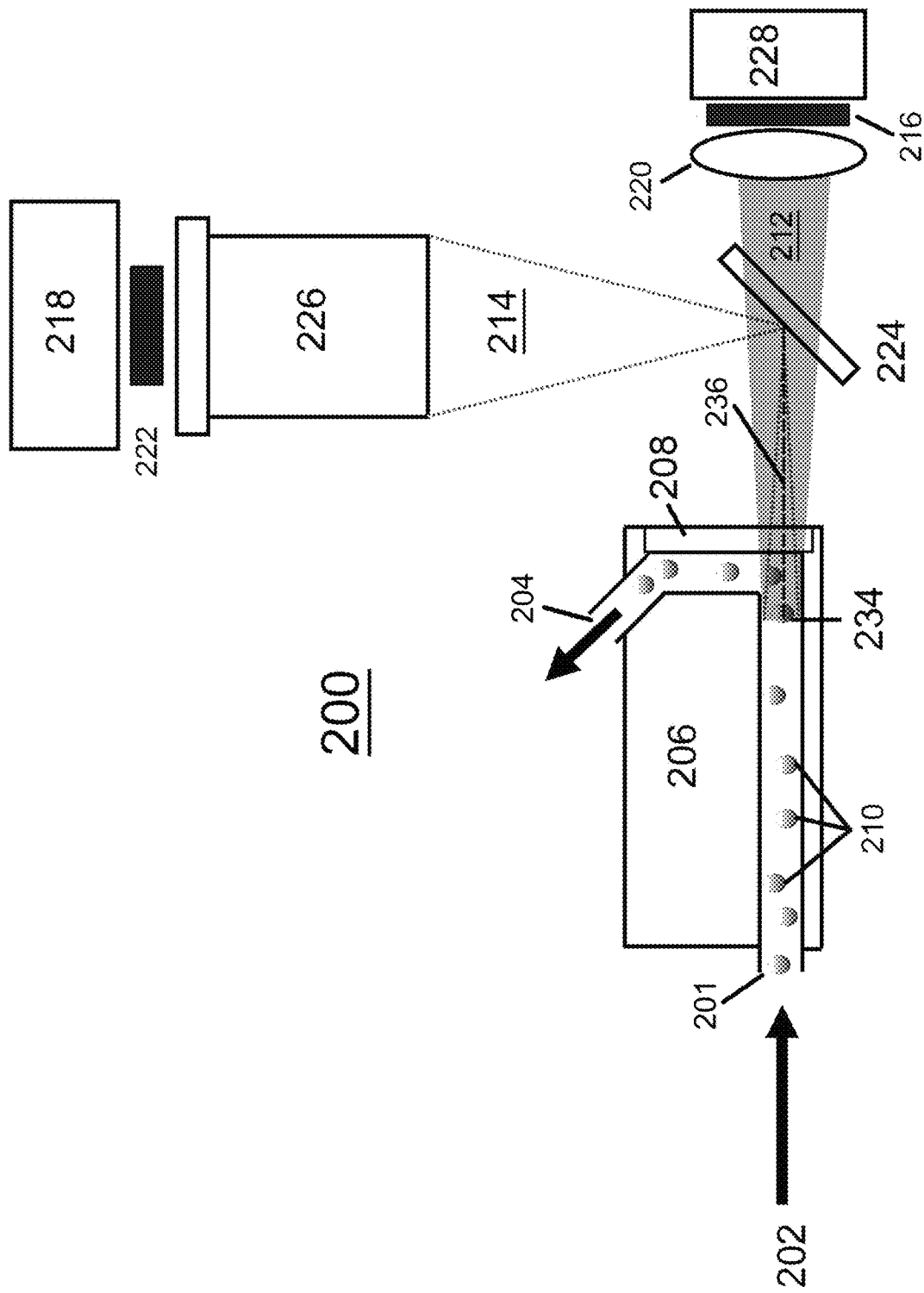
FIG. 2 (Prior Art) is a schematic diagram of a CFFC showing the flow of a sample, containing cells, moving through the focal plane of an imager.
Figure 5A:
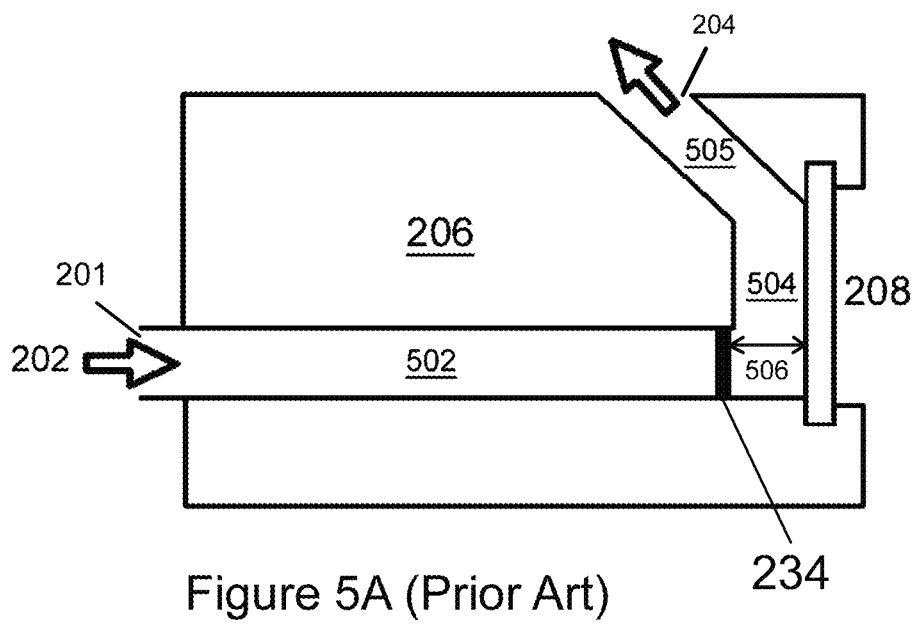
FIG. 5A (Prior Art) shows a side cutaway view of an exemplary flow cell of a CFFC.
Figure 5B:
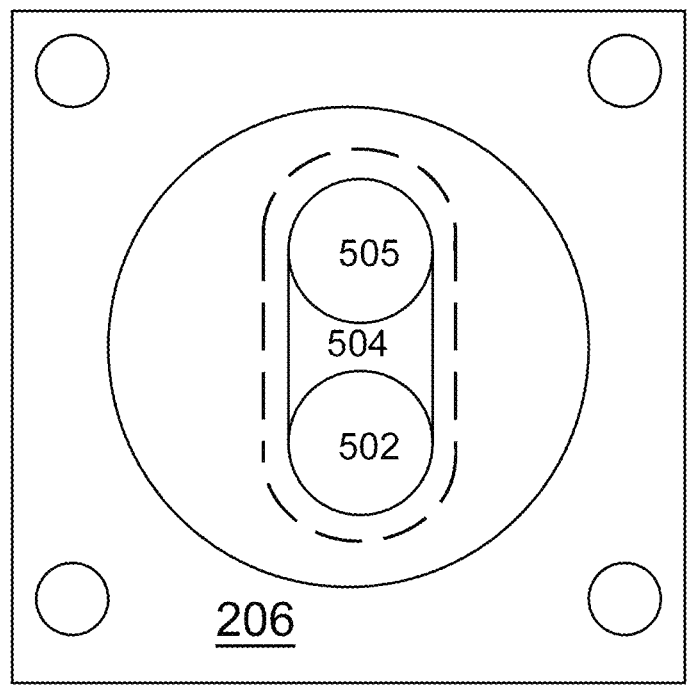
FIG. 5B (Prior Art) shows a front view of the flow cell depicted in FIG. 5A.

Background regarding the configuration of a CFFC is illustrative in explaining and understanding the inventive techniques described herein. FIG. 5A (Prior Art) shows a side cutaway view of a flow cell 206 of a CFFC. FIG. 5B (Prior Art) shows a front view of the flow cell 206. Reference to FIG. 2 (Prior Art) is illustrative as well.

The flow cell 206 forms a flow cell channel 502, 504, 505 (e.g., formed from an acetal homopolymer resin such as black Delrin® to reduce fluorescence), and a flow cell window 208, which in some embodiments is sealed with an O-ring and retained in place by a black anodized aluminum end cap, with four mounting through-holes. The fluid sample 202 enters the flow cell channel portion 502 at entrance 201, which in this example is substantially horizontal, then flows to portion 504 which is substantially vertical, and then flows to portion 505, which is inclined back approximately 45 degrees to horizontal. The fluid sample 202 exits the flow channel as effluent at exit 204. In various embodiments, the orientations of the flow cell channel portions 502, 504, 505 can be altered from the orientation shown in FIG. 5A, as desirable. In general, the flow cell channel can have any desirable diameter, e.g., in a range from 1 mm to 10 mm, from 2 mm to 8 mm, from 3 mm to 7 mm, or from 4 mm to 6 mm. As one particular example, the flow cell channel can have a diameter of 4 mm.

In the exemplary flow cell 206 shown in FIGS. 5A and 5B, the illuminated volume between the focal plane 234 and the window 208 is defined by the beam of illumination 212 generated from the LED 228 which can be focused at or near the focal plane 234. The distance between the focal plane 234 and the window 208 is designated with reference numeral 506. In general, the beam of illumination 212 can have any desirable shape, e.g., square, rectangular, circular, oval, etc. The focal plane 234 can be located any desirable distance behind the flow window 208 which can be located at any desirable distance from the focal plane of the LED illumination beam (distinct from the imager focal plane 234). The distance from the focal plane 234 to the window 208 can be, by way of example, in a range from 1 mm to 10 mm, from 2 mm to 8 mm, from 3 mm to 7 mm, or from 4 mm to 6 mm. In certain embodiments, the focal plane 234 can be located 3 mm to 4 mm, for example 3.0 mm, 3.1 mm, 3.2 mm, 3.3 mm, 3.4 mm, 3.5 mm, 3.6 mm, 3.7 mm, 3.8 mm, 3.9 mm, or 4 mm behind the flow window 208. The portion of the illuminated volume that contributes to background consists of the illuminated portion of the flow cell channel (e.g., portions 502 and 504), as well as the illuminated length of input-tubing (not shown) entering the flow cell channel along the optical axis. In some instances, the illumination volume can extend around certain bends in the input tubing, e.g., via a light-pipe effect, whereby illumination and/or emission is transmitted along the input tubing via internal reflections.

In certain embodiments, the FFC can be operated in reverse, e.g., such that the arrows are reversed and the sample 202 enters the flow cell 206 at the exit 204 and exits the flow cell 206 at the entrance 201.

Constraining the Interrogated Volume

As used herein, the term interrogated volume is defined as the amount of volume that contributes a significant amount of background light to images collected by a FFC. Generally, interrogated volume is the volume through which a certain percentage of incident light directed at sample 202 initiates fluorescence and/or scattering from target particles and from which a certain percentage of the fluoresced/scattered light is directed back toward the imager 218. The light directed back toward the imager 218 at wavelengths that are detectable by the imager 218 is sometimes referred to herein as detectable light. The wavelengths of incident light and detectable light may be separate and distinct and can be modified by the excitation and emission filters (216 and 222).

Quantitatively, if X % of the incident light directed along the flow axis reaches an incremental volume (dV) upstream of the window 208 and Y % of the light fluorescing or scattered from target particles in the same incremental volume directed along the optical axis reaches the window 208, then the interrogated volume is defined by the volume wherein X % times Y % is greater than a specified value. As used in this definition, X % and Y % are percentages that indicate the amount of light that is directed generally along the optical axis and do not account for fluorescence/scattering that redirect light off-axis.

More specifically, the interrogated volume is defined quantitatively as that volume for which X % multiplied by Y % (defined below) is greater than 20%, greater than 25%, greater than 30%, or greater than 35%. As a few particular examples, X % multiplied by Y % can be greater than 25%, greater than 26%, greater than 27%, greater than 28%, greater than 29%, greater than 30%, greater than 31%, greater than 32%, greater than 33%, greater than 34%, greater than 35%, and greater than 36%.

Said another way, more than X % of the light directed along the optical axis from the LED 228 and through the cell window 208 reaches a distal end of the illuminated volume. The amount of light returned (e.g., backscattered, fluoresced, etc.) from the end of the illuminated volume (volume dV) along the optical axis in the direction of the window 208 is attenuated by less than Y % before reaching the cell window 208.

In various embodiments, the values of X and Y can be varied (sometimes significantly) as the wavelengths of illumination and imaging are varied resulting in different optical properties of the sample. In the case where the distal boundary of the interrogated volume is defined by X % multiplied by Y % equals 36%, X % could theoretically equal 100% (no light attenuation in one direction) and Y % can equal 36%.

Figure 8A:
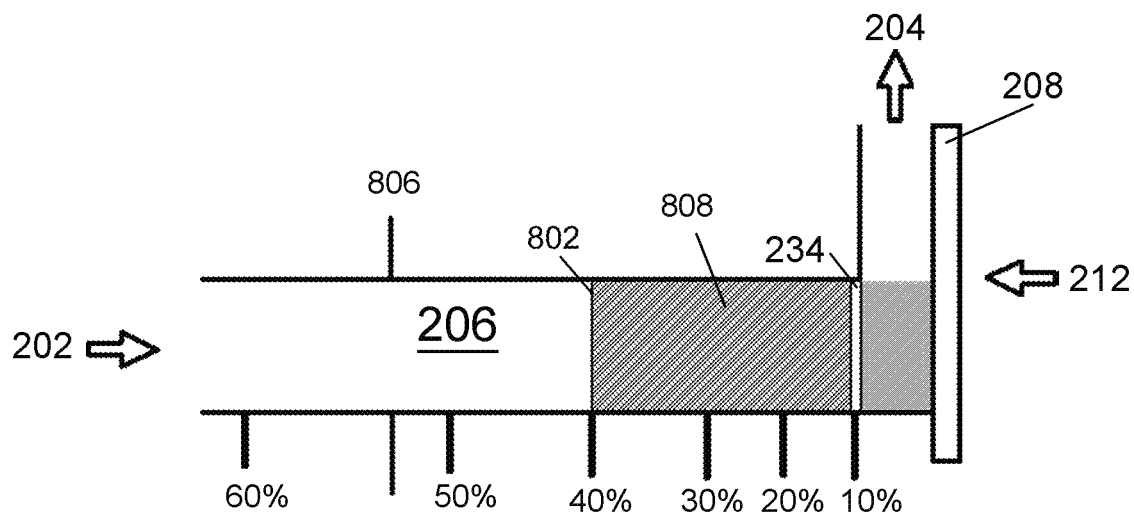
FIGS. 8A and 8B are side cutaway schematic views illustrating an interrogated volume and light absorption in a flow cell accordingly to exemplary embodiments of the invention.

The interrogated volume definition is illustrated with reference to FIG. 8A and FIG. 8B. The percentage values underneath the flow cell 206 in FIG. 8A represent the percentage attenuation of the original incident light 212 from the LED 228. In FIG. 8A, at the location marked by 10%, 90% of the incident light penetrates the sample 202; at the location marked by 20%, 80% of the incident light penetrates the sample 202; at the location marked by 30%, 70% of the incident light penetrates the sample 202; and at the location marked by 40%, 60% of the incident light penetrates the sample 202.

Figure 8B:
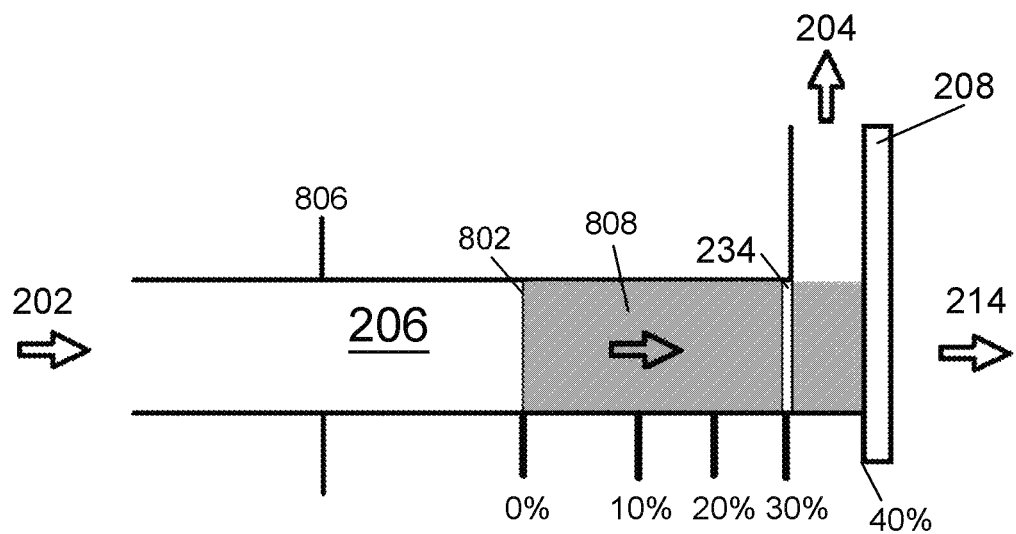

The percentage values underneath the flow cell 206 in FIG. 8B represent the percentage attenuation of the fluoresced/scattered light starting at the distal end 802 of the interrogated volume and travelling back toward the imager 218. However, the starting value for the light at the distal end 802 of the interrogated volume is a fraction of the original incident light that reached that location, and is fluorescently re-emitted or scattered toward the window and parallel to the optical axis at wavelengths that are detected by the imaging device. In FIG. 8B, at the location marked by 0% (the distal end 802 of the interrogated volume), the light returned from the distal end 802 of the interrogated volume (illuminated by 60% of the incident light) is not attenuated at all; at the location marked by 10%, the light returned from the distal end 802 of the interrogated volume (illuminated by 60% of the original incident light) is attenuated by 10% (i.e., X %=60%, Y %=90%, X % Y %=54%); at the location marked by 20%, the light returned from the distal end 802 of the interrogated volume is attenuated by 20% (i.e., X %=60%, Y %=80%, X % Y %=48%); at the location marked by 30%, the light returned from the distal end 802 of the interrogated volume (illuminated by 60% of the original incident light) is attenuated by 30% (i.e., X %=60%, Y %=70%, X % Y %=42%); and at the location marked by 40%, the light returned from the distal end 802 of the interrogated volume (illuminated by 60% of the original incident light) is attenuated by 40% (i.e., X %=60%, Y %=60%, X % Y %=36%). Assuming that the amount of light that reaches the location marked by 40% in FIG. 8B is delivered to the imager 218, then in this example X=60% and Y=60%, resulting in X multiplied by Y equaling 36% and the interrogated volume would be the portion of the flow cell channel extending to location 802.

For a CFFC cell 206 as shown in FIGS. 2 and 5 (Prior Art), the amount of background light is a function of the length of the interrogated volume (as defined above). In a simple approximation, one can assume that (i) light travels into the cylindrical volume of the flow cell channel at the cell window 208 (assuming sample flow enters the flow cell 206 at the distal end of the channel as shown in FIG. 2), (ii) the light illuminates each cross-section of that volume uniformly, and (iii) scatter and fluorescent emission from throughout the volume will travel back to the imager 218. Thus, it makes logical sense that in general, the longer the interrogated volume, everything else being equal, the greater the amount of background detected.

The amount of background detected can be controlled by optically constraining (limiting) the interrogated volume. Generally, constraining the interrogated volume involves controlling the length of the volume, because the diameter of the volume is often predetermined by the size of the beam of illumination 212 (note that a cylindrical volume is defined by the equation: $\pi$ (diameter)$^2$(length)/4. Several techniques for constraining the interrogated volume have been discovered, so as to reduce the amount of background detected. For example, the interrogated volume can be constrained by placing a bend or taper in the Fountain Flow cell (see, e.g., FIGS. 9A, 9B, and 9C), or by introducing a light absorbing reagent into the sample 202, to limit the amount of volume that can be penetrated by the illumination 212 (said another way, to render the sample 202 translucent).

Figure 6:
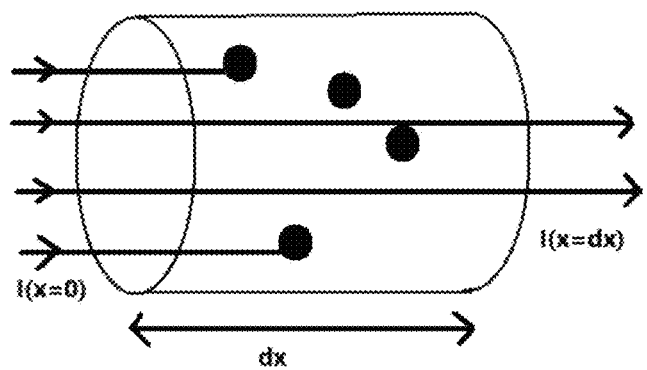
FIG. 6 is an exemplary schematic diagram showing light passing through a medium with some of the light being absorbed.

Given that the interrogated volume is dependent upon the amount of light that penetrates the sample 202, a description of how light penetrates a CFFC is helpful background for understanding how the present invention constrains the interrogated volume. FIG. 6 is a schematic diagram showing light passing through a medium with some of the light being absorbed. For a parallel beam of light traveling through a tube filled with water, for example, the light will be attenuated only slightly. In the case of a CFFC (see FIG. 2), light enters the flow cell 206 after travelling through an input tube (not shown) that connects to the distal end of the flow cell channel. The cell channel and tubing generally act as a light pipe with light internally reflected off the tubing and cell channel walls, unless the walls have been roughened or otherwise texturized, which is often undesirable because it can negatively affect flow dynamics and trap target particles. Because water has a low optical absorption coefficient at visible wavelengths (about $2 \times 10^{-4}$ cm$^{-1}$), in CFFC the interrogated volume is primarily determined by absorption of light by the dye in the flow cell 206 and input tubing. For example, given these assumptions, light directed into a gently curved tube 100 cm long containing a water-based sample will only be attenuated by about 2% at visible wavelengths. To control the interrogated volume (e.g., limiting the length to about 2 cm) the invention uses either a physical boundary (sometimes referred to herein as a "bend", defined as a physical structure that significantly inhibits the transmission of light, e.g., by at least 40%, at least 50%, at least 60%, at least 70%, at least 80%, at least 90%, or by about 100%) or an optical boundary by adding an light absorbing reagent to the sample (e.g., Evans Blue or Trypan Blue) which absorbs light at the wavelengths of illumination (e.g., from the LED 228) and detected emission (e.g., from the fluorescent dye of interest), but does not itself significantly fluoresce when illuminated and detectable at those respective wavelengths.

Volume/Geometry of Interrogated Volume

Various techniques for constraining the interrogated volume are described below. For the addition of absorbing reagent, one approach for quantifying an amount of constraint is the ratio of the interrogated volume to the portion of the interrogated volume between the focal plane and the window 208. In general, the background intensity is roughly proportional to the length of interrogated volume for a given channel diameter, making a length of interrogation volume less than 4 cm desirable. In the case of a fluid with an absorbing dye or reagent, the amount of light absorption attenuating target particles detected at the focal plane 234 is approximately proportional to the distance 506 between the focal plane 234 and the window 208. In addition, it can be difficult to construct an FFC with a distance 506 between the window 208 and the focal plane 234 of less than 1 mm. It is therefore desirable to have the ratio of (interrogation volume length)/(distance from focal plane to window) or alternatively (interrogation volume)/(interrogation volume between focal plane and window) be less than 40:1, e.g., 35:1, 30:1, 25:1, 20:1, 15:1, 10:1, or 5:1.

Various techniques for constraining the interrogated volume are described below. However, irrespective of the constraining technique used, in one aspect the invention includes any cytometry device having an interrogated volume and/or length of the interrogated volume of a value within a particular range (defined below) that is smaller than the interrogated volume and/or length of the interrogated volume of CFFCs.

In some embodiments, the interrogated volume has a cylindrical geometry, the volume of which is defined by the equation $\pi$ (diameter)$^2$ (length)/4. The diameter of the interrogated volume can be in a range from 1 mm to 25 mm, from 2 mm to 8 mm (e.g., from 2 mm to 4 mm, from 3 mm to 7 mm, or from 4 mm to 6 mm), for example 1 mm, 2 mm, 3 mm, 4 mm, 5 mm, 6 mm, 7 mm, 8 mm, 9 mm, or 10 mm. The length of the interrogated volume can be in a range from 0.1 cm to 10 cm, from 1 cm to 9 cm, from 2 cm to 8 cm, from 3 cm to 7 cm, or from 4 cm to 6 cm, for example, 0.5 cm, 1 cm, 1.5 cm, 2.0 cm, 2.5 cm, 3.0 cm, 3.5 cm, 4.0 cm, 4.5 cm, 5.0 cm, 5.5 cm, 6.0 cm, 6.5 cm, 7.0 cm, 7.5 cm, 8.0 cm, 8.5 cm, 9.0 cm, 9.5 cm, or 10 cm. Using these values and the equation for cylindrical volume, the interrogated volume can be 0.75 $mm^3$ to 50,000 $mm^3$, from 10 $mm^3$ to 1,000 $mm^3$, from 100 $mm^3$ to 500 $mm^3$, or from 200 $mm^3$ to 300 $mm^3$, for example 10 $mm^3$, 20 $mm^3$, 30 $mm^3$, 40 $mm^3$, 50 $mm^3$, 60 $mm^3$, 70 $mm^3$, 80 $mm^3$, 90 $mm^3$, 100 $mm^3$, 110 $mm^3$, 120 $mm^3$, 130 $mm^3$, 140 $mm^3$, 150 $mm^3$, 160 $mm^3$, 170 $mm^3$, 180 $mm^3$, 190 $mm^3$, 200 $mm^3$, 210 $mm^3$, 220 $mm^3$, 230 $mm^3$, 240 $mm^3$, 250 $mm^3$, or 260 $mm^3$. As one example, the interrogated volume can have a diameter of 2 mm and a length of 2 cm, resulting in an interrogated volume of about 63 $mm^3$. As another example, the interrogated volume can have a diameter of 4 mm and a length of 2 cm, resulting in an interrogated volume of about 252 $mm^3$. In certain embodiments, the range for interrogated volume is in a range from 63 $mm^3$ to 252 $mm^3$.

Such interrogated volumes are smaller than the interrogated volumes in CFFCs. By way of an exemplary comparison, consider the interrogated volume of the CFFC described above comprising a cylinder with a 4 mm diameter and a tubing length of 100 cm. As mentioned, in a conventional device, 98% of light will be transmitted through the entire 100 cm, rendering the entire 100 cm part of the interrogated volume. The calculated interrogated volume is about 13,000 $mm^3$, which is significantly larger than the ranges of interrogated volume contemplated by the present invention for a 4 mm channel diameter.

Although a geometric cylinder is used for the above examples, the interrogated volume can occupy these volume ranges with any volumetric shape, e.g., prism (cube, cuboid, parallelepiped, etc.), cone, cylinder (circular, ovular, etc.), pyramid, etc.

Constraining Interrogated Volume with a Bend in the Flow Cell

Another technique for constraining the interrogated volume is to introduce a bend into the flow cell channel. The bend can block the transmission of light which limits the volume into which the light from the LED 228 can penetrate, thus limiting the interrogated volume (as defined above). As used herein, the term "bend" refers to a physical structure within a channel having a distal portion 912, a transitional portion 914, and a near portion 916, that blocks transmission of light such that the amount of light that exits the distal portion 912 is less than a predetermined percentage of the light that enters the near portion 916. The predetermined percentage can be in a range from 0.01% to 30%, 0.1% to 25%, 0.2% to 20%, 0.3% to 15%, 0.5% to 10%, 0.7% to 5%, 0.8% to 3%, 0.9% to 2.5%, and 1% to 2% (e.g., 1.1%, 1.2%, 1.3%, 1.4%, 1.5%, 1.6%, 1.7%, 1.8%, and 1.9%).

It has been observed that, in order to effectively implement a bend within the flow cell channel, that the amount that the interrogated volume is constrained should be balanced against the streak length of the detected particles in FFC images. For a flow cell with an abrupt angular dogleg in the flow cell input and a nearly transparent fluid matrix, the interrogated volume is that part of the sample 202 that is penetrated by the LED illumination 212 directed through the window 208. This volume is depicted by the shaded portion of FIG. 9B.

When fluid flows through a bend, a radial pressure gradient is created by the centrifugal force acting on the fluid. As a result, the fluid at the center of the pipe moves towards the outer side and comes back along the wall towards the inner side, which creates a double spiral flow field. Thus, introducing a bend into a FFC can produce a transverse flow velocity which can produce horizontal streaks in particle images (e.g., due to smearing of the detection over significantly more pixels than would occur with no bend).

The particle streaking concept is further illustrated with reference to FIGS. 4A-4C. FIG. 4A is a schematic drawing showing individual pixels in the focal plane 234 as squares and a particle flowing through a single pixel in the focal plane 234. FIG. 4B is a side cutaway view of the trajectory of a cell moving through the focal plane 234. As a cell moves through the plane of focus, the shape of its image changes, shrinking as it comes into focus, then expanding as it moves out of focus, and finally elongating as it moves horizontally into adjacent pixels during the exposure. The shape of the detected spot in each numbered layer in FIG. 4B is shown in FIG. 4C. Thus, transverse particle velocity as the particle moves during an image exposure will result in an elongated image (i.e., a streak).

In general, streaking is more prominent for higher flow velocities, greater bending angles, and shorter distances between the bend and the focal plane. Thus, in optimizing signal-to-noise, there is a trade-off between the amount to which the interrogated volume is constrained and the streak length generated, especially when noise is dominated by background noise.

To quantify the competing effects of streak length and reduction of background, it is noted that FFC detects faint particles against background. If particles do not produce an intensity greater than about 3 standard deviations above background noise, they are typically not seen by the detection algorithm. Therefore, if the interrogated volume is constrained such that streak length is increased by, for example, 3 times, then the increase in streak length lowers the signal in each pixel by a factor of 3, offsetting any decrease in background noise. Therefore, to achieve an improvement in the signal-to-noise of measurements collected by a FFC by introducing a bend into the flow cell channel, the decrease in background noise must also offset the associated increase in streak length.

As one example, by effectively reducing the interrogated volume of a flow cell having a 4 mm diameter to a length of about 2 cm by adding a channel bend, it has been discovered that the amount of background detected is reduced by 3-fold or more, relative to a conventional channel having a length of about 100 cm keeping all other parameters the same.

Figure 9A:
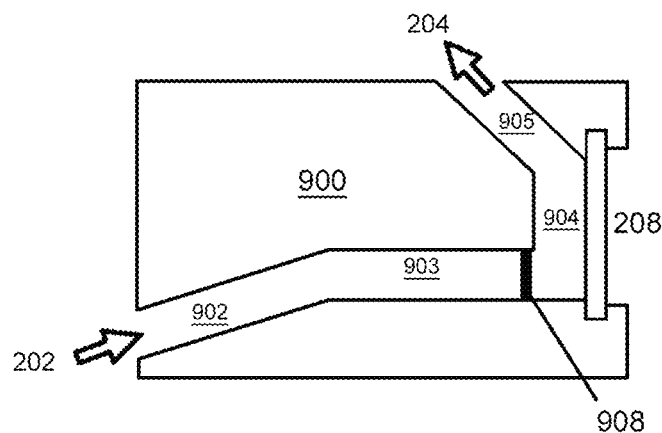
FIG. 9A shows a side cutaway view of an improved flow cell according to exemplary embodiments of the invention.
Figure 9B:
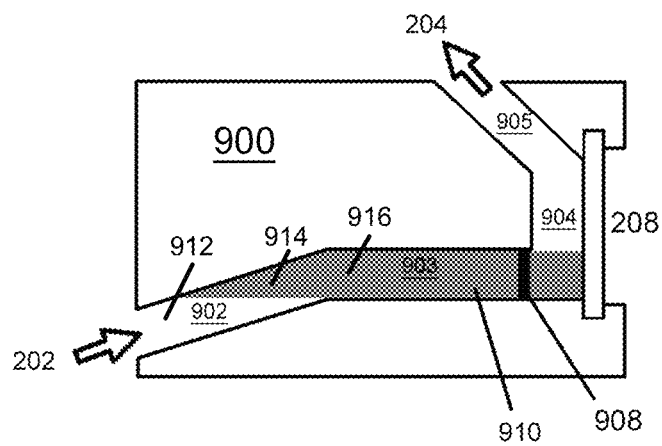
FIG. 9B shows the volume of the flow cell depicted in FIG. 9A that is both illuminated and viewable (within the field of view) by the imaging system.
Figure 9C:
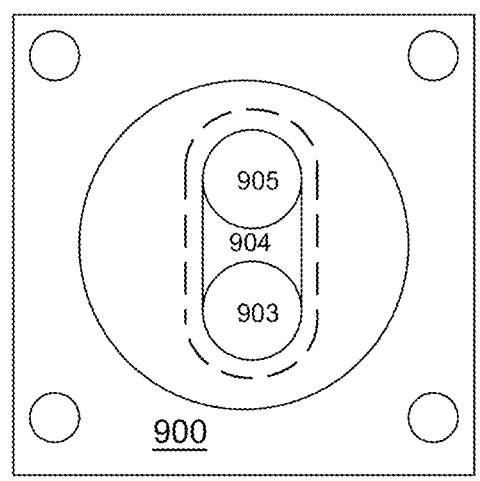
FIG. 9C shows a front view of the flow cells depicted in FIGS. 9A and 9B.

FIGS. 9A-9C illustrate the effect of a bend in constraining the interrogated volume. FIG. 9A shows a side cutaway view of a short path (improved) flow cell 900 according to the present invention. FIG. 9B shows the interrogated volume of cell 900 as the shaded portion of flow cell channel 903. FIG. 9C shows a front view of the flow cell 900. The flow cell 900 includes flow cell channel portions 902, 903, 904, 905 (which can be formed from black Delrin® to reduce fluorescence), and a flow cell window 208 (which can be sealed with an O-ring and/or retained in place by a black anodized aluminum end cap, with four mounting through holes). The sample 202 enters flow cell channel portion 902, which is inclined 30 degrees to horizontal, then flows to channel portion 903, which is inclined 10 degrees to horizontal (in this example channel portions 902 and 903 are 4 mm in diameter), then flows to channel portion 904, which is vertical, and then flows to channel portion 905, which is inclined back 45 degrees to horizontal. The sample 202 exits the flow cell 900 as effluent.

In some instances, in order to constrain the interrogated volume of the FFC, the flow cell 900 can be shortened and the external input tubing can use an L-bend (90-degree bend) at the flow cell entrance. In other instances, the flow cell channel can be formed with an angled (dogleg) bend (e.g., as shown in FIG. 9A). FIG. 9B illustrates how the interrogated volume 910 (shaded) of the flow cell 900 can be constrained by a bend in the flow cell channel. It has been discovered that, in practice, physically shortening the length of the interrogated volume 910 to a length in a range from 0 cm to 2 cm, from 0.3 cm to 1.7 cm, from 0.6 cm, to 1.4 cm, or from 0.9 cm to 1.1 cm, for example 0.1 cm, 0.2 cm, 0.3 cm, 0.4 cm, 0.5 cm, 0.6 cm, 0.7 cm, 0.8 cm, 0.9 cm, 1.0 cm, 1.1 cm, 1.2 cm, 1.3 cm, 1.4 cm, 1.5 cm, 1.6 cm, 1.7 cm, 1.8 cm, 1.9 cm, or 2.0 cm, can be effective in reducing significant amount of background. In some cases, reducing the length significantly below 1 cm can introduce challenges in maintaining a relatively linear trajectory along the optical axis through the focal plane at certain flow velocities (e.g., about 0.5 cm/s). At certain flow velocities, shortening the optical axis too much can produce trajectories with significant velocity transverse to the optical axis, leading to streaking of particles on images. Such streaking can negate the background reduction benefits of constraining the interrogated volume.

Constraining Interrogated Volume with a Light Absorbing Reagent

Another approach for constraining the interrogated volume is to introduce a light absorbing reagent into the sample 202 containing the particles of interest 210. Given the definition of interrogated volume as being a volume through which a certain percentage (e.g., 64%) of the incident light penetrates and is returned to the imager 218, this volume can be limited by attenuating the transmission of light with an absorbing reagent. The absorbing reagent attenuates the transmission of light (see, FIG. 6), which has an equivalent effect in reducing background light and accompanying background noise as the physical bend described above.

The effect of a light absorbing reagent on the intensity of light traversing the sample 202 is governing by Equations 1 and 2 below:

$$I = I_0 e^{-\tau}, \text{ where } \tau = \alpha dx \qquad \text{Equation (1)}$$

$$I \approx I_0 (1-\tau) \text{ for } \tau \ll 1.0 \qquad \text{Equation (2)}$$

where:

$I_0$ is the intensity of light traversing through the sample 202 at point x;

I is the intensity of light after traversing a distance dx, from x to x+dx;

τ is optical depth (unitless; defined as the natural logarithm of the ratio of incident to transmitted radiant power through a material);

α is optical absorption coefficient ($cm^{-1}$); and dx is optical path length (cm).

Figure 7:
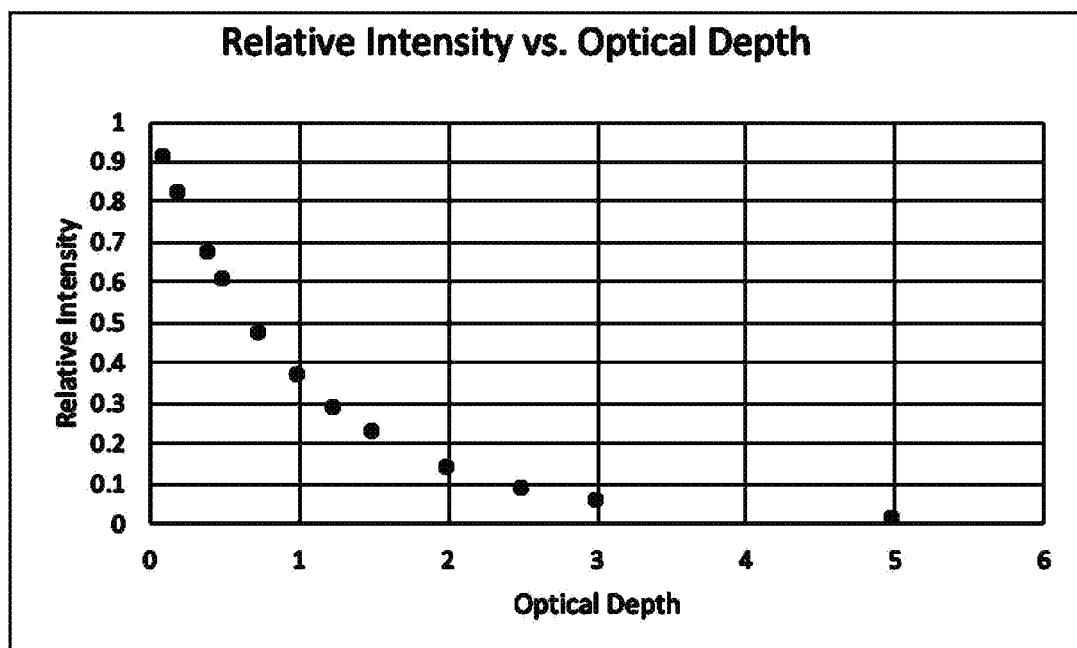
FIG. 7 is a plot showing exemplary data of relative intensity versus optical depth in a medium.

Equation 2 is generally called the optically thin approximation. FIG. 7 is a plot showing exemplary data of relative intensity versus optical depth in a medium. FIG. 7 shows a decrease in light intensity, I, with optical depth, τ. Of note is that in the optically thin regime, where optical depth τ≪1.0, the relationship between I and τ, is approximately linear, as given in Equation 2.

In some embodiments, the optimum concentration of absorbing reagent in FFC is determined by the distance 506 from the flow cell window 208 (touching the fluid) to the focal plane 234 of the imaging device. This distance is typically no larger than the flow cell tubing diameter (e.g., in a range from 4 mm to 8 mm) and no less than about 1 mm. In some instances, it is desirable that the absorption along this distance (to and from the focal plane, or twice the distance 506) be, for example, no larger than about 20% to limit the negative effects of absorbing signal light emitted from target particles. For this explanation, it is assumed that the optical absorption coefficient of the absorbing reagent is approximately equal at both the wavelength of emission and absorption. For the optically thin approximation (Equation 2) the intensity of light is decreased by about 2αdx (a fractional reduction by T in each direction). In various embodiments, it can be desirable for 2αdx to be less than a value in a range from 0.1 to 0.4, from 0.15 to 0.35, or from 0.2 to 0.3. As one particular example, it can be desirable for 2αdx to be less than 0.2 to avoid excessive loss of signal from the fluorescing particles of interest. These parameters can be used to select an appropriate α for a particular assay. For example, an α can be chosen such that 2αdx=0.20, when dx (reference numeral 506)=4 mm (i.e., the distance from the window 208 to the focal plane 234), as may be the case for a 4 mm diameter flow cell. For this same case, at a distance 5 times further into the flow channel (506=2 cm), the optical depth is 5 times greater, or 2αdx=1.0. From Equation 1, one finds that 63% of the incident light has been attenuated at 2 cm and 86% at 4 cm.

As with the example above, by effectively reducing the interrogated volume of a flow cell having a 4 mm diameter to a length of about 2 cm by adding a light absorbing reagent to the sample 202, it has been discovered that the background intensity can be reduced by about 3-fold or more relative to a conventional channel, having a length of 100 cm keeping all other parameters the same. Background noise can be reduced by a factor of 2 or more under these same conditions.

FIGS. 8A and 8B illustrate the effect of a light absorbing reagent in constraining the interrogated volume. FIG. 8A illustrates an increase in light absorption with upstream (or distal) distance from the window 208 in a conventional configuration of a flow cell 206 (without a bend in the channel). This schematic shows that illumination light 212 from an LED 228 or other source of illumination has a 90% penetration (less than 10% is absorbed) adjacent to the imaging focal plane 234, and 50% penetration (50% absorbed) near the flow cell input tubing connector 806. Thus, the interrogated volume is limited based on the amount of light that is absorbed.

FIG. 8B shows background light absorption as light transmits from the distal end 802 of the interrogated volume 808 (shaded) through the focal plane 234 and toward the flow cell window 208. In this case 40% of the illumination is absorbed (60% transmitted) going toward the distal end and 40% of that 60% of the detectable light is returned to the window 208 giving a total of a 64% two-way reduction of the light energy from the original illumination light 212 (as measured by X % times Y %), with only a 20% two-way reduction between the focal plane 234 and the window 208. When combined with other techniques (e.g., limiting Raman emission described below), background emission can be reduced by more than a factor in a range from 5 to 13, from 8 to 12, from 9 to 11 (e.g., by more than a factor of 10).

Geometric Description of Constrained Interrogated Volume

As noted above, in various embodiments, regardless of the technique used to constrain the interrogated volume (e.g., introducing a bend into the flow cell channel, adding a light absorbing reagent to the sample, or some other technique), the amount that the interrogated volume is constrained can be described geometrically. As one example, and in some embodiments, it has been discovered that desirable results can be obtained if the interrogated volume is constrained such that a ratio of the interrogated volume to the portion of the interrogated volume disposed between the focal plane 234 and the window 208 is below a particular value, which in various embodiments can be 3:1, 5:1, 7:1, 10:1, 15:1, 20:1, or 25:1.

Signal-To-Noise Reduction Description of Constrained Interrogated Volume

In other embodiments, regardless of the technique used to constrain the interrogated volume, the amount that the interrogated volume is constrained can be described by its effect on the signal-to-noise ratio of the measurements performed by the FFC.

A brief description of the signal-to-noise ratio (sometimes referred to herein as just "signal-to-noise") is illustrative. For faint target particles, the signal-to-noise of a FFC detection is a measure of the mean intensity of light detected from sources of interest (e.g., fluorescence from the stained particles), referred to as the "signal," divided by the standard deviation in the measured intensity of those sources. For faint particles (low signal-to-noise detections), and measurements of particles with relatively uniform intensity, noise is typically dominated by variations (stochastic, temporal and/or spatial) in background, including from Raman scattered light and from fluorescence from unbound dye (dye not attached to particles). This is often the case for the measurements performed on samples 202 including particles 210 stained with fluorescent dyes (as shown in Tables 1-3 below).

It has been discovered that, in some embodiments, desirable results can be obtained if the interrogated volume is constrained using a constraining means (e.g., a bend in the flow cell channel, a light absorbing reagent, or another means), such that when the sample 202 is illuminated by the illumination beam 212, a signal-to-noise ratio of the measurement collected by the imager 218 (sometimes referred to herein as a signal-to-noise ratio achieved by the FFC) is increased by a particular amount compared to an equivalent apparatus that does not include the constraining means when operating under the same conditions (e.g., conditions that have a measureable or material effect on the measurements collected by the FFC). The particular amount that the signal-to-noise ratio is increased can be in a range from 1.25-fold to 5-fold, from 1.5-fold to 4-fold, from 1.75-fold to 3-fold (e.g., 2-fold). In general, the signal-to-noise value produced or achieved by a particular FFC can be defined as the mean intensity of a standard reference calibration bead divided by the optical limit of detection (defined below). Quantitative comparisons can be made by comparing the intensity of light returned to the imager 218 with and without the interrogated volume constraining means described herein (as described further in the Examples section below).

As another example, it has been discovered that in some embodiments desirable results can be obtained if the interrogated volume is constrained using a constraining means (e.g., a bend in the flow cell channel, a light absorbing reagent, or another means), such that the detectability of particles disposed within the focal plane 234 and illuminated by the illumination beam 212 is increased by a particular amount relative to an equivalent apparatus that does not contain the constraining means when operating under the same conditions (e.g., conditions that have a measurable or material effect on the measurements collected by the FFC). As particular non-limiting examples, the detectability can be increased in a range from 1.25-fold to 5-fold, from 1.5-fold to 4-fold, from 1.75-fold to 3-fold (e.g., 2-fold).

In other embodiments, constraining the interrogated volume can improve the sensitivity and/or dynamic range of the FFC. As the term is used herein, sensitivity is a measure of the optical limit of detection (LOD). Detections occur, in general, over one or more pixels that encompass the image, or blurred image, of a single target particle. In general, LOD is about 3 times the noise (pixel-to-pixel standard deviation) characterizing the images in which particles are being detected. In other embodiments, LOD can have a different value, e.g., 2 times noise, 4 times noise, 5 times noise, and 10 times noise. Detections are generally made by summing the light intensity values of contiguous pixels that are 3 times above the noise value. As in the examples shown in Tables 1-3 below, baseline noise can be determined by differencing two sequential images that do not include a detected particle and computing the standard deviation from the resulting difference image from within the target. The target is that part of the image in which illuminated particles can be detected as they pass through the focal plane 224 (coincident with the interior of the imaged FFC cell channel).

As the term is used herein, dynamic range can be computed from using the following equation: $(I_{max}-I_{min})/LOD$, where $I_{max}$ is the mean intensity of saturated pixels within the target and $I_{min}$ is the mean intensity of non-saturated pixels within the target. Exemplary measurements of dynamic range are shown in Table 1 below (where measured intensity from detections can have a range from 0 to 255).

Optimizing Excitation/Emission Filters

It has also been discovered that Raman scattering can have a significant effect on FFC measurements. Thus, another aspect of the invention is the selection of appropriate excitation and emission filters to minimize background, including from Raman scattering and dye fluorescence, while improving the signal-to-noise ratio. In some embodiments, selection of the appropriate filters is accomplished by examining the theoretical Raman spectrum for water and empirically comparing a selection of filters near the dye absorption and emission peaks. The Examples in the section below provide exemplary data collected using this process.

EXAMPLES

The following examples provide exemplary data supporting the finding that background noise is reduced by the various approaches described herein.

Example 1—Use of a Modified Flow Cell to Reduce Interrogated Volume

This first example demonstrates the effect of disposing a bend within the flow cell to reduce the amount of background noise measured by the system. The example demonstrates that the bend reduces the background noise by about 6-fold, doubles the dynamic range, and cuts the noise of measurements in half (as measured by pixel-to-pixel standard deviation of background), as compared to systems without the bend.

In particular, the following Tables 1-3 compare measurements collected using the conventional flow cell 206 shown in FIGS. 5A and 5B with measurements collected using the improved flow cell 900 having a bend illustrated in FIGS. 9A and 9B. The interrogated volume of fluid seen in the improved flow cell 900 is less than half of that seen in the conventional flow cell 206, especially if the entrance tubing is considered as an extension of the flow cell because it adds to background intensity and noise.

Figure 3A:
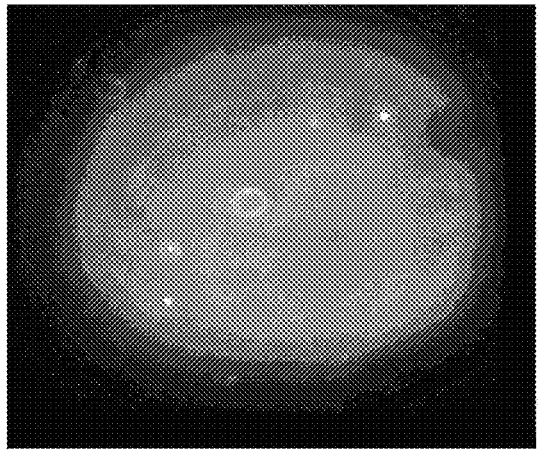
FIGS. 3A, 3B, and 3C (Prior Art) are exemplary images produced using the CFFC apparatus of FIG. 2.
Figure 3B:
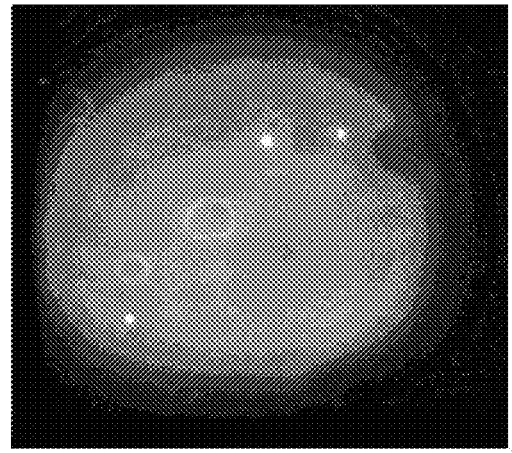
Figure 3C:
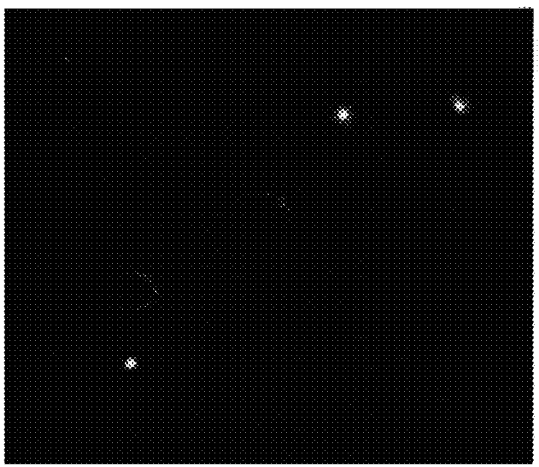

Table 1 below shows a comparison of the mean background intensity and noise measured from single images. Square sub-images (about 100×100 pixels) were chosen in the center of the flow cell channel and a dark corner of the image (e.g., where images are similar to those in FIG. 3). The intensity values of the images were analyzed for mean (background intensity) and standard deviation (background noise). Comparisons were made for samples 202 of WCC+SG (Lonza™ water+SYBR Green I nucleic acid stain, diluted in DMSO at 30 μl/ml), WCC, and WCC+Solo (Lonza™ water+Solophenyl 7GFE 500, hereafter referred to as Solophenyl, at 5 mg/100 ml). FFC system 1 is a conventional flow cell 206, and FFC system 2 is an improved flow cell 900.

TABLE 1

| Type of FFC System | Sample | Mean | Std. |
|---|---|---|---|
| 1 | WCC + SG* | 153.46 | 5.35 |
|   | WCC** | 151.97 | 5.18 |
|   | WCC + Solo*** | 158.82 | 5.13 |
| 2 | WCC | 25.01 | 2.66 |
|   | WCC + SG | 28.60 | 2.86 |
|   | WCC + Solo | 30.39 | 2.94 |

*WCC + SG is Lonza ™ Water + SYBR Green I nucleic acid stain, diluted in DMSO at 30 μl/ml
**WCC is Lonza ™ Water
***WCC + Solo is Lonza ™ Water + Solophenyl 7GFE 500 at 5 mg/100 ml As demonstrated in Table 1, it was discovered that the mean background intensity measurement in the conventional flow cell 206 is about 6 times higher than the mean background intensity in the improved flow cell 900. In addition, the mean background intensity measurement in the conventional flow cell 206 occupies more than half of the dynamic range (0 to 255) of the imager 218 used to perform the measurements at this gain. Moreover, the standard deviation of the sub-image is almost twice as large in the conventional flow cell 206 compared to the improved flow cell 900.

Table 2 below shows a comparison of mean background intensity measurement differences and standard deviations (noise) after differencing two images in sequence (one or two frames apart) taken at a gain of 8 and exposure time of 60 ms. Square sub-images (about 100×100 pixels) were chosen in the center of the flow cell channel and a dark corner of the image. Mean differences, and standard deviations were measured. Comparisons are made for flows with WCC+SG, WCC, and WCC+Solo, as in Table 1 above. In Table 2, FFC system 1 uses a conventional flow cell 206, and FFC system 2 uses an improved flow cell 900.

TABLE 2

| | | On Center | | Dark Corner | |
|---|---|---|---|---|---|
| Type of FFC System | Sample | Mean Diff. | Std. | Mean Diff. | Std. |
| 1 | WCC + SG* | 0.1 | 6.54 | 0.02 | 2.61 |
|   | WCC** | 1.39 | 6.57 | 0.16 | 2.63 |
|   | WCC + Solo*** | 0.04 | 6.67 | 0.03 | 2.65 |
| 2 | WCC | 0.07 | 3.38 | 0.02 | 2.53 |
|   | WCC + SG | 0.07 | 3.44 | 0.07 | 2.55 |
|   | WCC + Solo | 0.13 | 3.57 | 0.03 | 2.55 |

*WCC + SG is Lonza ™ Water + SYBR Green I nucleic acid stain, diluted in DMSO at 30 μl/ml
**WCC is Lonza ™ Water
***WCC + Solo is Lonza ™ Water + Solophenyl 7GFE 500 at 5 mg/100 ml As demonstrated in Table 2, it was discovered that there are significant differences between the dark corner and channel center, and between the conventional flow cell 206 and the improved flow cell 900. As the data shows, differencing images eliminates the time constant component of background, but does not increase dynamic range, and actually increases the standard deviation (as expected since each image will have an independent contribution to noise). The data also reveals that the improved flow cell 900 has approximately half the contribution to standard deviation in the image center.

Table 3 below shows a comparison of noise measurements collected from dark frames (LED off) at different gains and exposure times with a conventional flow cell 206.

TABLE 3

| Sample | Exp (ms) | Gain | Mean | Std. |
|---|---|---|---|---|
| a | 30 | 8 | 0.21 | 0.52 |
| b | 60 | 8 | 0.23 | 0.54 |
| c | 100 | 8 | 0.36 | 0.7 |
| d | 60 | 15 | 0.8 | 1.41 |

As demonstrated in Table 3, although gain and exposure time do produce differences in noise (as expected) these differences are much smaller than those produced by background when measuring water and dye, even in the dark corner of an image (as shown in Table 2).

Example 2—Use of a Light Absorbing Reagent to Reduce Interrogated Volume

This second example demonstrates the effect of introducing a light absorbing reagent into the sample to reduce the amount of background noise measured by the system.

As shown in this example, it has been discovered that a variety of light absorbing reagents can effectively reduce background noise in FFC (e.g., Trypan Blue and Evans Blue). However, it is contemplated that multiple reagents can be used. Those skilled in the art will appreciate that the invention contemplates use of any reagent that does not excite/fluoresce significantly at the wavelengths of illumination/emission being used and that introduces an optical depth less than 1 between the focal plane 234 and the flow cell window 208 while increasing the opacity of the viewed/illuminated flow below the focal plane (distance from the window 208) and that reduces background significantly more than it reduces signal.

Using a chemical suppressant that renders the particle staining dye non-fluorescent (e.g., Clorox® bleach) can reduce background, but also unacceptably reduces signal from the stained particles. Trypan Blue and Evans Blue have emission spectra that are well outside the fluorescence detection wavelength (530 nm) used in certain embodiments, with Evans Blue having an emission peak at 650 nm and Trypan Blue having an emission peak at 670 nm. When staining Candida sp. spores with Solophenyl Flavine 7GFE 500 with a 10 minute incubation they appear bright under the microscope. However Candida spores suspended in an aqueous solution are more difficult to detect with FFC after incubation with Solophenyl, as the background from unwashed dye suspended in solution is too bright. Adding Evans Blue to the solution after a 10 minute incubation and just before Fountain Flow enumeration allows high signal to noise measurements to be made (as long as the measurements are made shortly after addition, e.g., within tens of minutes, before Evans Blue is absorbed to the spore cell wall, significantly attenuating the fluorescence signal).

It is possible to determine the optimal concentration of the quenching agent by comparing quenching efficacy of dyes using a plate reader in which quenching efficiency and quenching agent opacity were measured simultaneously. This can be performed using fluorescent microbeads suspended in a candidate nucleic acid dye/buffer mixture. This assay was modified for 96-well plate analysis using a 96-well plate reading spectrophotometer (SpectraMax M2$^e$) with fluorescence detection capability to facilitate high throughput screening of novel quenching agents. Fluorescent microbeads were suspended in various concentrations of quenching agent and the fluorescence measured at 530 nm when illuminated at 465 nm. Then the fluorescence, also at 530 nm, of each candidate dye in buffer (with the same concentrations of quenching agent) was measured. By measuring the decrease in microbead fluorescence intensity due to quenching agent opacity, and the decrease in fluorescent emission of the candidate dye due to dye quenching, automated for 96-well sample analysis, it was possible to quickly test the effects of a large number of dye/quencher cocktails in a short period of time. Although this setup is different from a FFC, it provides an initial measurement that can be rapidly optimized by a FFC directly.

Figure 10:
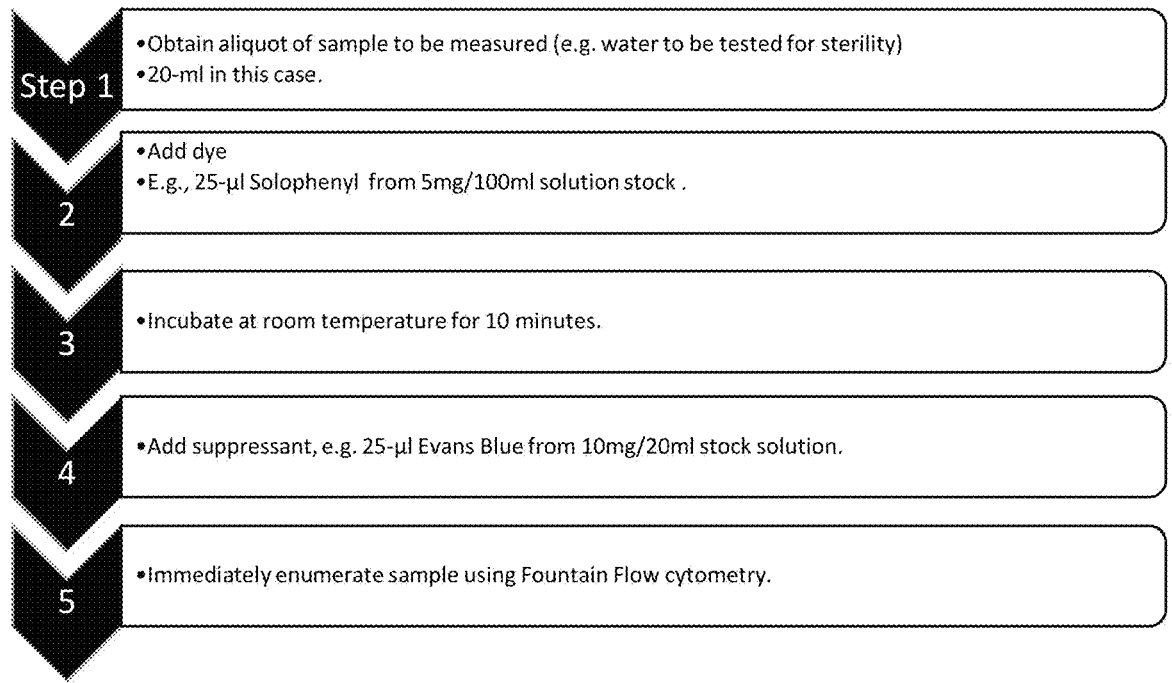
FIG. 10 is a flow diagram illustrating exemplary steps in a protocol for attenuating background and concomitant noise during staining, using a Solophenyl stain, as an exemplary stain.

FIG. 10 is a flow diagram illustrating an exemplary protocol for attenuating background during staining, using Solophenyl staining as an example. In one embodiment, the procedure for enumerating Candida spores in water (or yeast cells in general), for example, includes adding Solophenyl (stock solution of 10 mg/200 ml in sterile phosphate buffered saline) to an aliquot of sample, incubating for 10 minutes, and then adding Evans Blue (stock solution of 10 mg/20 ml in sterile water), according to the following steps:

1. Obtain a 20-ml aliquot of spores suspended in water.
2. Add 25 µl of Solophenyl stock and incubate for 10 minutes.
3. Add 25 µl to 50 µl of Evans Blue stock.
4. Run immediately with FFC as Evans Blue (or Trypan Blue) can be absorbed by microorganisms (fungal cells especially) and will attenuate signal in tens of minutes.

This protocol for reducing background from Solophenyl in staining yeast is not limited to Solophenyl, nor staining yeast. This protocol can be used for other stains and other microorganisms. Other dyes include, but are not limited to: fungal cell wall dyes (Pontamine Fast Scarlet and Calcofluor White), nucleic acid dyes (e.g., SYBR Green I, Pico Green, SYBR Green II, DAPI, SYTO-9, SYTO-11, SYTO-13, SYTO-16, and SYTO-BC), and viability dyes (e.g., ChemChrome CV6).

Figure 11:
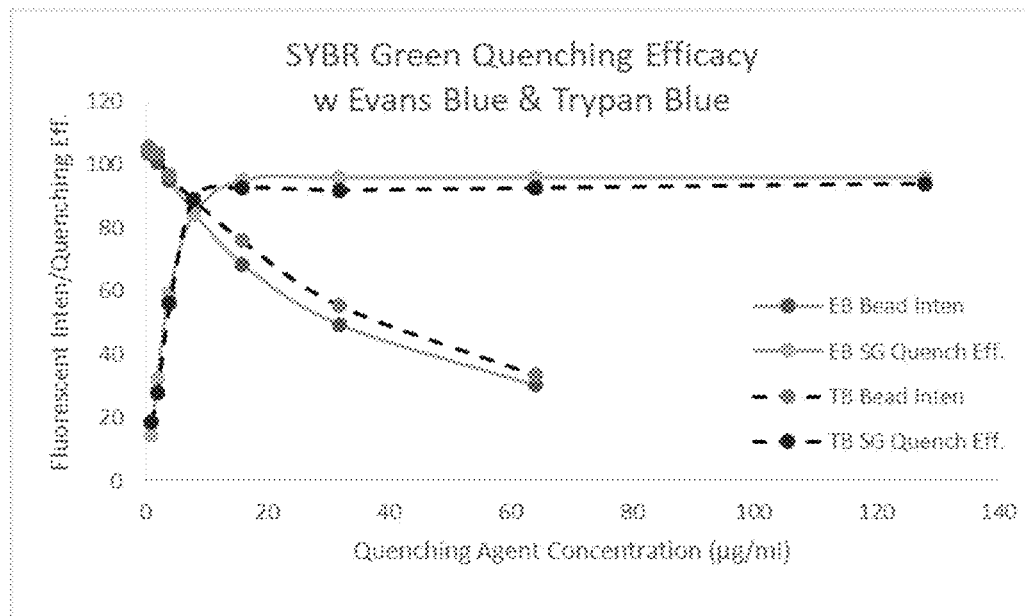
FIG. 11 is a plot showing exemplary microplate reader data of relative microbead fluorescence intensity and SYBR Green I quenching efficiency of a microbead/dye buffer mixture as a function of quenching agent dose.

FIG. 11 is a plot showing relative microbead fluorescence intensity and SYBR Green I quenching efficiency of a bead/dyed buffer mixture as a function of quenching agent. Measurements were made with a SpectraMax M2e microplate reader (with 11 mm well depth). Optimal quenching for Trypan Blue and Evans Blue (where the relative microbead intensity curves and quenching efficiency curves cross) were at about 8 µg/ml. Quenching efficiency is the percentage reduction of SYBR Green I intensity relative to maximum intensity.

Figure 12:
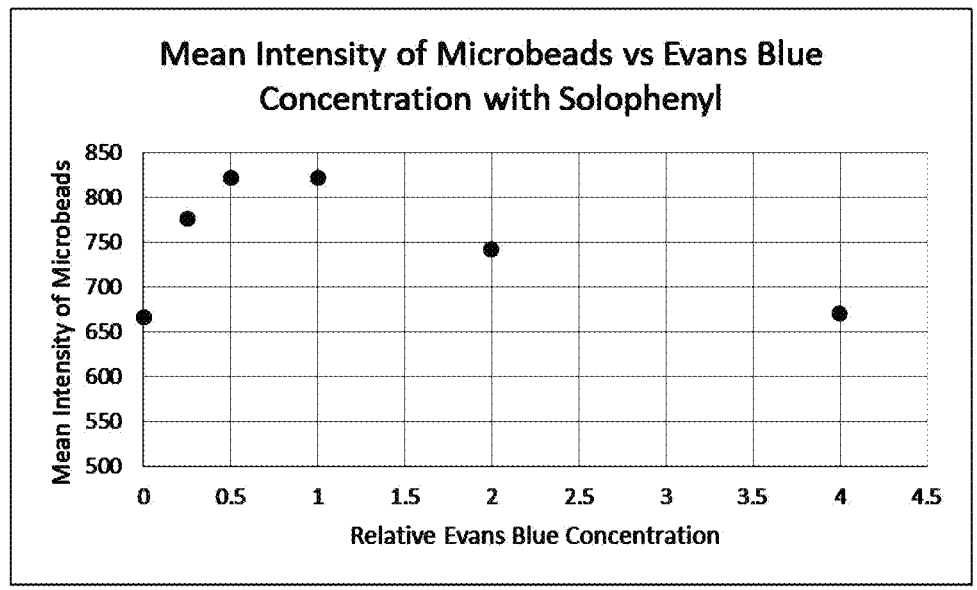
FIG. 12 is a plot showing exemplary FFC data of mean intensity of individual Accucount 4.0 micron fluorescent microbeads in water with Solophenyl at various concentrations of Evans Blue.

FIG. 12 is a plot showing FFC analysis of samples of Accucount 4.0 micron fluorescent microbeads in water with Solophenyl (with the concentration given in Table 1) with microbead intensity at six different concentrations of Evans Blue. Of note is that at low concentrations of Evans Blue the microbeads begin to become overwhelmed by the background and the measured microbead intensity decreases as the detector is in the nonlinear portion of sensitivity, closer to the maximum of its dynamic range. At high concentrations of Evans Blue, obscuration of microbeads suppresses the overall intensity of the beads.

Figure 13:
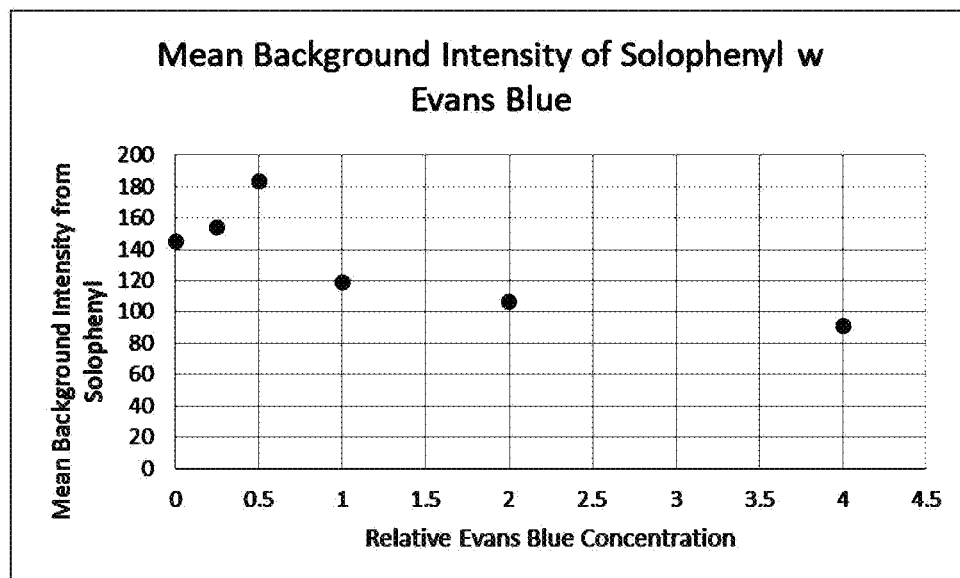
FIG. 13 is a plot showing exemplary FFC data of mean background intensity of samples of Accucount 4.0 micron fluorescent microbeads in water with Solophenyl at various concentrations of Evans Blue (the same samples used for FIG. 12)

FIG. 13 is a plot showing exemplary FFC analysis of samples of Accucount 4.0 micron fluorescent microbeads in water with Solophenyl (the same samples shown in FIG. 9) with background intensity at various concentrations of Evans Blue. Of note is that at low concentrations of Evans Blue the background is high and variable, decreasing notably at relative concentrations of 1.0 and greater.

Together, FIGS. 12 and 13 show the effects of varying concentration of Evans Blue on Solophenyl, both signal and background, when used with FFC to detect microorganisms (or in this case, fluorescent 4.0 micron Accucount microbeads (Spherotech) used to simulate stained microorganisms). A blue/green excitation/emission pair of filters was used in this illustration. Increasing the concentration of Evans Blue decreases background. Above a certain concentration, increasing the concentration of Evans Blue unacceptably obscures fluorescence from faint target particles (microorganisms, or microbeads in this case.) FIGS. 12 and 13 show an optimum concentration of Evans Blue, in some embodiments, of about 1.0, corresponding to a concentration of 1 µg/ml.

Example 3—Optimization of Excitation/Emission Filters to Reduce Raman Scattering This third example demonstrates the effect of optimizing excitation/emission filters to reduce Raman Scattering and thereby reduce the amount of background noise measured by the system.

This example shows that it is possible to optimize excitation/emission filters by examining the theoretical Raman spectrum for water and/or empirically comparing a selection of filters near the dye absorption and emission peaks.

Table 4 below shows example filter pairs that were selected to match emission/absorption peaks for SYBR Green I as well as minimize Raman scattering background. Table 4 shows Semrock™ excitation/emission filter pairs (filters designated by center wavelength (nm) and bandpass (nm)) and FFC intensity measurements from background Raman scattering in distilled water plus background contributions due to instrument fluorescence (i.e. background with no added dye) compared with FFC intensity measurements from 5 µM of SYBR Green I in water. Columns marked with ** indicate filter pairs with significant bandpass overlap, making their use generally impractical. Filter pairs can be selected by minimizing background intensity while maximizing the intensity of SYBR Green I in water. The noise contribution from Raman scattering (plus instrument fluorescence) can be approximated by the square root of the water without dye intensity. Thus, in this example Signal/Noise can be calculated as (the intensity of SYBR Green I in water)/(the square root of background without any dye). The effect of Raman scattering (plus instrument fluorescence) on dynamic range can be quantified as (the intensity of water with dye)/(background intensity without dye), referred to in this example as Signal/Background. In this example, the filter pair that best optimizes both Signal/Noise and Signal/Background is bolded: 482/25 excitation and 520/28 emission.

TABLE 4

| Excitation Filter | Emission Filter | Distilled water Background | 5 μM SYBR Green | Signal/ Background | Signal/ Noise |
|---|---|---|---|---|---|
| 482/35 | 536/40 | 1.56E+06 | 5.47E+06 | 3.51 | 4381 |
| 482/25 | 536/40 | 9.54E+05 | 3.58E+06 | 3.75 | 3667 |
| 472/30 | 536/40 | 2.31E+06 | 6.68E+06 | 2.89 | 4392 |
| 482/35 | 520/35 | ** | ** | ** | ** |
| 482/25 | 520/35 | 6.18E+05 | 2.57E+06 | 4.16 | 3272 |
| 472/30 | 520/35 | 1.12E+06 | 4.02E+06 | 3.60 | 3803 |
| 482/35 | 520/28 | ** | ** | ** | ** |
| 482/25 | 520/28 | 4.43E+05 | 2.78E+06 | 6.28 | 4180 |
| 472/30 | 520/28 | 1.10E+06 | 4.01E+06 | 3.65 | 3827 |
| 482/35 | 525/30 | 7.87E+05 | 3.47E+06 | 4.42 | 3918 |
| 482/25 | 525/30 | 3.99E+05 | 2.45E+06 | 6.16 | 3887 |
| 472/30 | 525/30 | 1.14E+06 | 4.39E+06 | 3.86 | 4115 |

Figure 14:
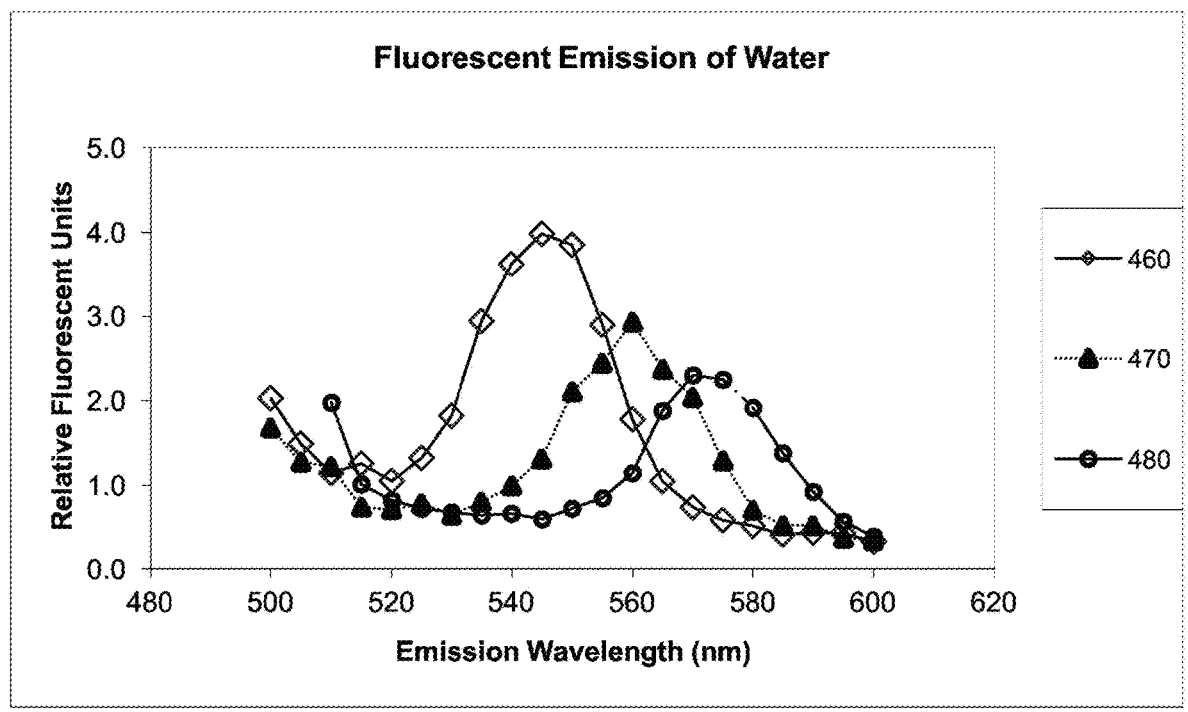
FIG. 14 is a plot showing exemplary Raman emission spectra from water at excitation wavelengths of 460 nm, 470 nm, and 480 nm.

FIG. 14 is a plot showing Raman emission spectra from water at various excitation wavelengths (460 nm, 470 nm, and 480 nm) as measured by fluorimeter. This data agrees with the detailed empirical and theoretical Raman spectra given by Bartlett et al., 1998 (Applied Optics 37(15), 3324-3332).

EQUIVALENTS

The invention may be embodied in other specific forms without departing from the spirit or essential characteristics thereof. The foregoing embodiments are therefore to be considered in all respects illustrative rather than limiting the invention described herein. Various structural elements of the different embodiments and various disclosed method steps may be utilized in various combinations and permutations, and configurations, and all such variants are to be considered forms of the invention.

What is claimed is:

1. An apparatus for enumerating particles in a liquid sample comprising:
an imaging flow cytometer configured to flow the sample along a flow axis within a channel, the channel having an imaging end and a distal end, the imaging flow cytometer comprising:
a transparent element transverse to the flow axis disposed at the imaging end of the channel;
an illumination beam positioned to illuminate, through the transparent element, at least a portion of the sample and thereby particles in the sample; and
an imager for imaging an area in a focal plane transverse to the flow axis within the portion of the sample illuminated by the illumination beam; and
a constraining means for constraining an interrogated volume of the sample so that, when the sample is illuminated by the illumination beam, a signal-to-noise ratio achieved by the apparatus is increased by at least two-fold compared to an equivalent apparatus without the constraining means when operating under the same conditions.

* * * * *